US008706681B2

(12) United States Patent
Barber

(10) Patent No.: US 8,706,681 B2
(45) Date of Patent: Apr. 22, 2014

(54) SYSTEM AND METHOD FOR PROCESSING AND/OR ANALYZING OLAP BASED DATA ACCORDING TO ONE OR MORE PARAMETERS

(75) Inventor: Paul Grant Barber, Mississauga (CA)

(73) Assignee: Prophix Software Inc., Mississauga (CA)

( * ) Notice: Subject to any disclaimer, the term of this patent is extended or adjusted under 35 U.S.C. 154(b) by 1052 days.

(21) Appl. No.: 12/243,498

(22) Filed: Oct. 1, 2008

(65) Prior Publication Data

US 2010/0082524 A1 Apr. 1, 2010

(51) Int. Cl.
*G06F 7/00* (2006.01)
*G06F 17/00* (2006.01)

(52) U.S. Cl.
USPC .......................................... 707/603; 715/700

(58) Field of Classification Search
USPC ........... 707/600, 603, 790, 791, 801; 715/700
See application file for complete search history.

(56) References Cited

U.S. PATENT DOCUMENTS

| | | | |
|---|---|---|---|
| 6,317,750 B1 * | 11/2001 | Tortolani et al. .............. | 707/103 |
| 6,460,059 B1 * | 10/2002 | Wisniewski ................... | 715/212 |
| 6,707,454 B1 * | 3/2004 | Barg et al. ..................... | 345/440 |
| 2002/0184260 A1 * | 12/2002 | Martin et al. .................. | 707/503 |
| 2003/0061225 A1 * | 3/2003 | Bowman et al. .............. | 707/100 |
| 2005/0091206 A1 * | 4/2005 | Koukerdjinian et al. ......... | 707/3 |
| 2006/0271841 A1 * | 11/2006 | Thanu et al. ................... | 715/503 |
| 2008/0294680 A1 * | 11/2008 | Powell et al. ................. | 707/102 |

OTHER PUBLICATIONS

Microsoft Office 2003, Wikipedia, http://en.wikipedia.org/wiki/Office_2003, pp. 4.*
Clarify and emphasize data in an Excel chart, Microsoft, http://office.microsoft.com/en-us/excel-help/clarify-and-emphasize-data-in-an-excel-chart-HA001034608.aspx, pp. 4.*
Edit cell contents, Microsoft, http://office.microsoft.com/en-us/excel-help/edit-cell-contents-HP005199972.aspx, pp. 2.*
Subtract numbers, Microsoft, http://office.microsoft.com/en-us/excel-help/subtract-numbers-HP003056140.aspx?CTT=1, pp. 2.*
Clarify and emphasize data in an Excel chart, Microsoft, http://office.microsoft.com/en-us/excel-help/clarify-and-emphasize-data-in-an-excel-chart-HA001034608.aspx, viewed Mar. 29, 2011, 4 pp.*
Edit cell contents, Microsoft, http://office.microsoft.com/en-us/excel-help/edit-cell-contents-HP005199972.aspx, viewed Apr. 6, 2011, 2 pp.*
Subtract numbers, Microsoft, http://office.microsoft.com/en-us/excel-help/subtract-numbers-HP003056140.aspx?CTT=1, Apr. 6, 2011, 2 pp.*

* cited by examiner

*Primary Examiner* — Marc Somers
(74) *Attorney, Agent, or Firm* — Bennett Jones LLP

(57) ABSTRACT

A system and method for processing a base vector derived from data stored in an OLAP cube. The system comprises a component configured for defining a base vector and a comparison vector, wherein the comparison vector comprises one or more dimensions corresponding to dimensions of the base vector. The system includes a component configured for defining a time scope associated with the base vector. The system further comprises a component configured for performing one or more analysis operations on the comparison vector to generate comparison values and a component configured for rendering the base and comparison vectors. According to another aspect, the system includes a component for altering or modifying individual data cells in the base vector and/or parameters associated with the base vector and/or analysis operation.

10 Claims, 17 Drawing Sheets

SYSTEM AND METHOD FOR PROCESSING AND/OR ANALYZING OLAP BASED DATA ACCORDING TO ONE OR MORE PARAMETERS

FIELD OF THE INVENTION

The present invention relates to computer systems and more particularly, to a data analysis processor configured for processing and/or analyzing a vector based on OLAP data.

BACKGROUND OF THE INVENTION

Online analytical processing or OLAP is a technique in business intelligence applications and comprises providing answers to analytical queries that are multidimensional in nature. Examples of OLAP applications include business reporting for sales, marketing, management reporting, business process management, budgeting and forecasting, financial reporting and the like.

Databases configured for OLAP applications typically comprise a multidimensional data model, often referred to as a "cube". A multidimensional data model allows for complex analytical queries with rapid execution time. The cube structure comprises aspects of navigational databases and hierarchical databases.

An OLAP cube can be thought of as an extension of the two-dimensional array of a spreadsheet, and comprises dimensions. In the context of an OLAP cube, dimensions provide additional methods for analyzing data. For example, an OLAP cube can be configured to allow a company to analyze financial data by product, by time-period, by city, by type of revenue and cost, and by comparing actual data with a budget. In a further aspect, a user, for example, a financial analyst, may want to view the data in various ways, such as displaying all the cities down the page and all the products across a page. This could be for a specified period, version and type of expenditure. Having seen the data in this particular way the analyst might then immediately wish to view it in another way. The cube structure provides the capability to re-orient the display so that the data displayed now had periods across the page and type of cost down the page. Because this re-orientation involved re-summarizing very large amounts of data, this new view of the data had to be generated efficiently to avoid wasting the analyst's time, i.e. within seconds, rather than the hours a relational database and conventional report-writer might have taken.

According to another aspect, it may be desirable to analyze data in a cube on a cell or tuple basis. For example, it may be desirable to provide a delta or % change analysis on data in a cube cell by comparing that data with cube data associated with another cell.

It will be appreciated that while an OLAP cube provides a flexible and multidimensional structure data model, there remains a need in the art for improvements, such as, data applications including data acquisition and processing techniques capable of exploiting the capabilities of an OLAP cube.

SUMMARY OF THE INVENTION

The present invention provides a method and system for processing and/or analyzing a vector based on information and data stored in an OLAP database.

According to one aspect, there is provided a system for processing a base vector derived from data in an OLAP database comprising: a component configured for defining the base vector, the base vector having a time dimension and one or more other dimensions; a component configured for defining a comparison vector and selecting one or more dimensions for the comparison vector wherein the selected one or more dimensions correspond to one or more dimensions of the base vector; a data analysis engine configured to apply one or more analysis operations to the comparison vector and modify the base vector according to the one or more analysis operations; and a component for rendering the base vector.

According to another aspect, there is provided a computer-implemented method for analyzing a base vector comprising data from an OLAP database, the method comprises the steps of: configuring the base vector wherein the base vector comprises a time dimension and one or more other dimensions; configuring a comparison vector and selecting one or more dimensions for the comparison vector wherein the selected one or more dimensions correspond to one or more dimensions of the base vector; applying one or more analysis operations to the comparison vector and modifying the base vector according to the one or more analysis operations; and rendering the resulting base vector.

According to a further aspect, there is provided a computer program product for processing a base vector comprising data from an OLAP database, said computer program product comprising: a storage medium configured to store computer readable instructions; the computer readable instructions including instructions for, defining the base vector wherein the base vector comprises a time dimension and one or more other dimensions; defining a comparison vector and selecting one or more dimensions for the comparison vector wherein the selected one or more dimensions correspond to one or more dimensions of the base vector; applying one or more analysis operations to the comparison vector and modifying the base vector according to the one or more analysis operations; and rendering the resulting base vector.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which:

FIG. 11(*b*) is an exemplary screen shot of the delta processor configured with a dialog box for specifying a time spread process for a non-Total entry in accordance with an embodiment;

FIG. 11(*c*) is an exemplary screen shot of a dialog box configured for specifying a dimension spread process in accordance with an embodiment;

FIG. 11(*d*) is an exemplary screen shot of a notification screen indicating that "prompting" for time and dimension spreading is turned off or inactive;

Like reference numerals indicate like or corresponding elements or components in the drawings.

DETAILED DESCRIPTION OF THE EMBODIMENTS OF THE INVENTION

Figure 1:
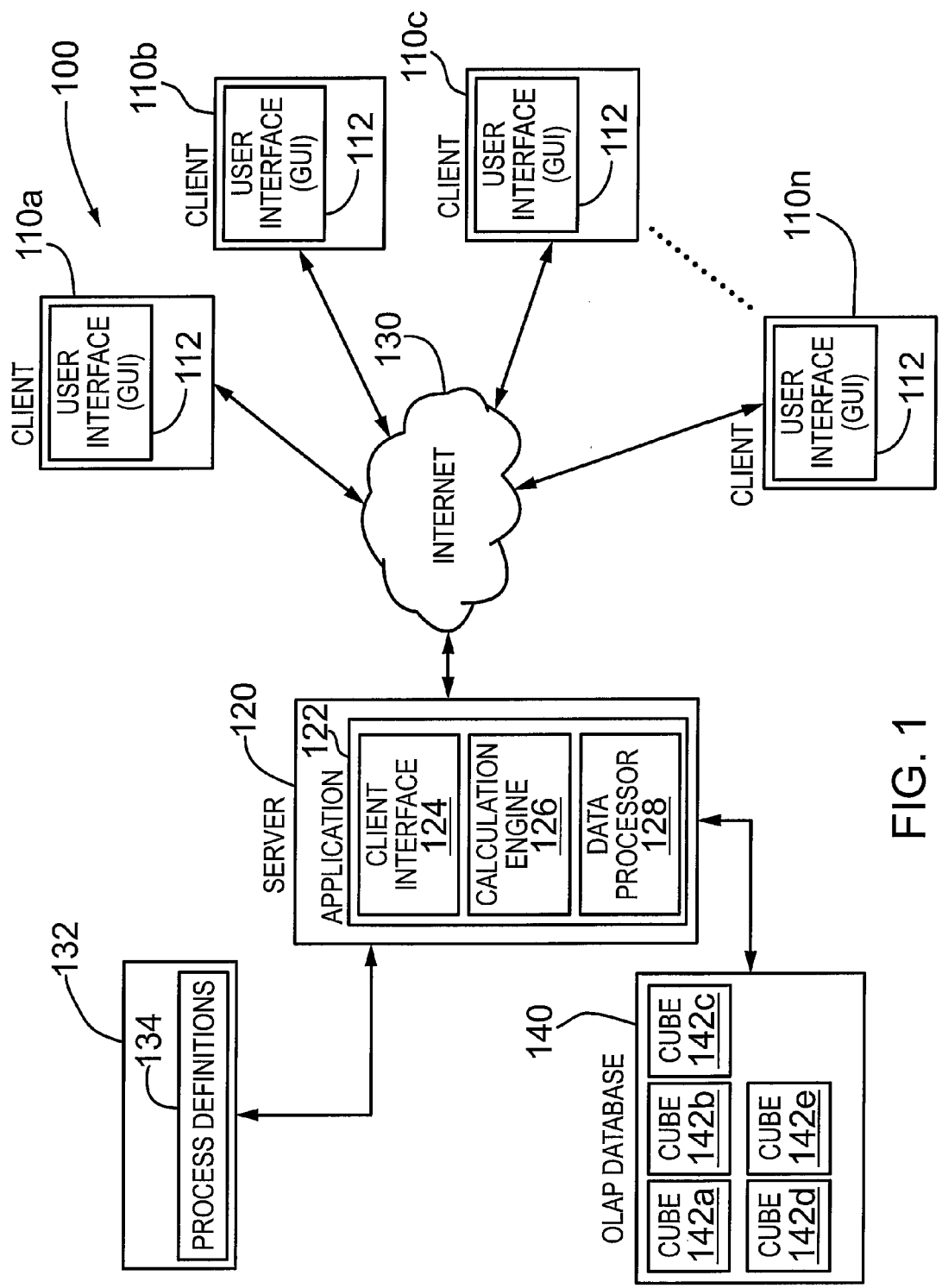
FIG. 1 shows in diagrammatic form an exemplary system for operating or executing methods or processing operations in accordance with an embodiment of the invention.

Embodiments according to the present invention are described below by way of a set of screen shots that would be displayed to a user of the system. The screen shots comprise exemplary data or information used by companies for planning, budgeting, monthly financial reporting and/or consolidation of financial results. In the context of the present description, numerical data is stored in an OLAP database, and comprises one or more cubes. Each cube comprises a structure based on dimensions and members.

The cubes and dimensions will vary from company to company. In addition, the names of dimensions within cubes can vary. For instance, a cube can have dimensions named "Accounts", "Versions" and "Time", and a number of other dimensions with other names. Each dimension comprises a list of members. For example, an "Organization" dimension in a cube comprises a list of departments and reporting entities for a company. The dimensions can also have a calculation structure that describes data aggregation, e.g. 'East Region'='New York' plus 'Boston', or a calculation structure that describes a more complex calculation, e.g. 'Benefits'=10% of 'Salaries'. It will be appreciated that calculations can also be different for each company.

In the context of the present description, data is stored in an OLAP database as a single numerical value for each dimension combination. For example, if the dimensions are 'Time', 'Accounts', 'Version' and 'Organization', each of which has a member called 'Jan08', 'Salaries', 'Plan' and 'Boston' respectively, then one numeric value is stored for this combination of members. Similarly, a different number is stored in the database for 'Feb08', 'Salaries', 'Plan' and 'Boston'.

Typically, data is accessed (i.e. imported) in an OLAP database at a detailed level, for example, using the 'Time', 'Accounts', 'Version' and 'Organization' dimensions (e.g. 'Jan08', 'Salaries', 'Plan' and 'Boston'). The data is then processed and reported at an aggregated level to provide historical information, for example, according to the dimensions, 'Total Year', 'Total Expenses', 'Plan' and 'Total Company'.

As will be described in more detail below, the present invention comprises embodiments of a processing mechanism or processor configured for taking any cell in an OLAP cube and generating a base vector for the selected cell and configuring a comparison vector associated with the base vector and performing operations on data for the base vector based on the comparison vector. The comparison parameters are configured for defining a time vector for entering data, and/or comparing time vectors, accounts, organizational groups or other entities. According to another aspect, the resulting base vector can be saved back to the cube, and made available in a report, and/or for further processing and/or analysis.

In accordance with embodiments of the present invention a system and techniques (e.g. computer-implemented processes) are described in more detail below for accessing data in an OLAP database and configuring processes or operations for comparing or analyzing the data according to one or more parameters or comparison benchmarks.

Reference is made to FIG. 1, which shows in diagrammatic form an exemplary operating environment and configuration for implementing and practising a system and processes according to embodiments of the present invention. The operating environment according to an embodiment and indicated generally by reference 100 comprises a client/server configuration. As shown, one or more clients 110, indicated individually by references 110*a*, 110*b*, 110*c*, ... 110*n*, access a server indicated by reference 120, for example, through a network 130. The network 130 may comprise a local area network (LAN), a wide area network (WAN), the Internet or any combination thereof. As shown the server 120 interfaces with a database 140. According to an embodiment, the database 140 is configured as an OLAP database and comprises a number of cubes 142, indicated individually by references 142*a*, 142*b*, 142*c*, 142*d*, 142*e*, . . . . The cubes 142 are configured with dimensions and members as described above and in further detail below. For the embodiment depicted in FIG. 1, the clients 110 are connected via the Internet indicated generally by reference 130. It will be appreciated that the method and system according to the present invention may be practised or implemented for other networks and/or configurations.

According to an embodiment, the system 100 includes a storage module indicated generally by reference 132. The storage module 132 is configured to store data process definitions, for example, as defined by a user. According to an embodiment, the storage module 132 is implemented using a relational data structure or configuration.

As shown in FIG. 1, the server 120 is configured with an application indicated generally by reference 122. According to an embodiment, the application 122 comprises a client interface module 124, a calculation engine module 126 and a data analysis module or processor (e.g. a processing mechanism configured for performing delta type analysis, i.e. a "delta processor") 128.

The client interface module 124 is configured to provide an interface with the client machines 110. According to an embodiment, the client interface module 124 is implemented with a user interface or GUI (Graphical User Interface) which runs on each of the client machines 110 as indicated generally by reference 112. According to an embodiment, the client interface module 124 and the user interface 112 comprise logic and processes configured to provide a user with the capability to specify a processing request for data in the database 140, i.e. a process for querying structural component(s) associated with one of the cubes.

The calculation engine module 126 comprises a computer-implemented process(es) or function(s) that runs on the server 120 and performs manipulation of data in the cube 142 according to a specification, i.e. a data process specified and provided by the user through the user interface 112. According to an embodiment, the execution of a data process is independent of the specification of the data process. For example, a data process can be executed multiple times and the execution of a data process can be scheduled to run at any time. According to an embodiment, the calculation engine is configured to execute process definition(s) retrieved or returned from the storage module 134.

Embodiments of the application 122, the client interface module 124, and the calculation engine module 126 are described in co-pending U.S. patent application Ser. No. 12/059,070, which was filed on Mar. 31, 2008 and is owned by the assignee in common with the subject application. The disclosure of U.S. patent application Ser. No. 12/059,070 is hereby incorporated by this reference in its entirety.

The data analysis module or processor (i.e. "delta processor") 128 comprises a computer-implemented process(es) or function(s) that runs on the server 120 and provides a mechanism to analyze data in any cell in the cube 142. According to an embodiment, the data analysis module 128 is implemented in the form of a software application or computer program and is stored in memory and executed to provide the functionality as described herein. According to an embodiment, the data analysis module 128 is configured to generate a base vector associated with the selected cell and execute a comparison or "Delta analysis" between the base vector and a comparison vector. According to another aspect, the data processor module 128 is configured to allow a user to change one or more values (i.e. data) in the base vector and execute the Delta analysis and store the resulting modified base vector in the cube. The operation and configuration of the data processor module 128 according to embodiments of the invention is described in more detail below with reference to the user interface and screen shots depicted in FIGS. 2 to 16.

Figure 2:
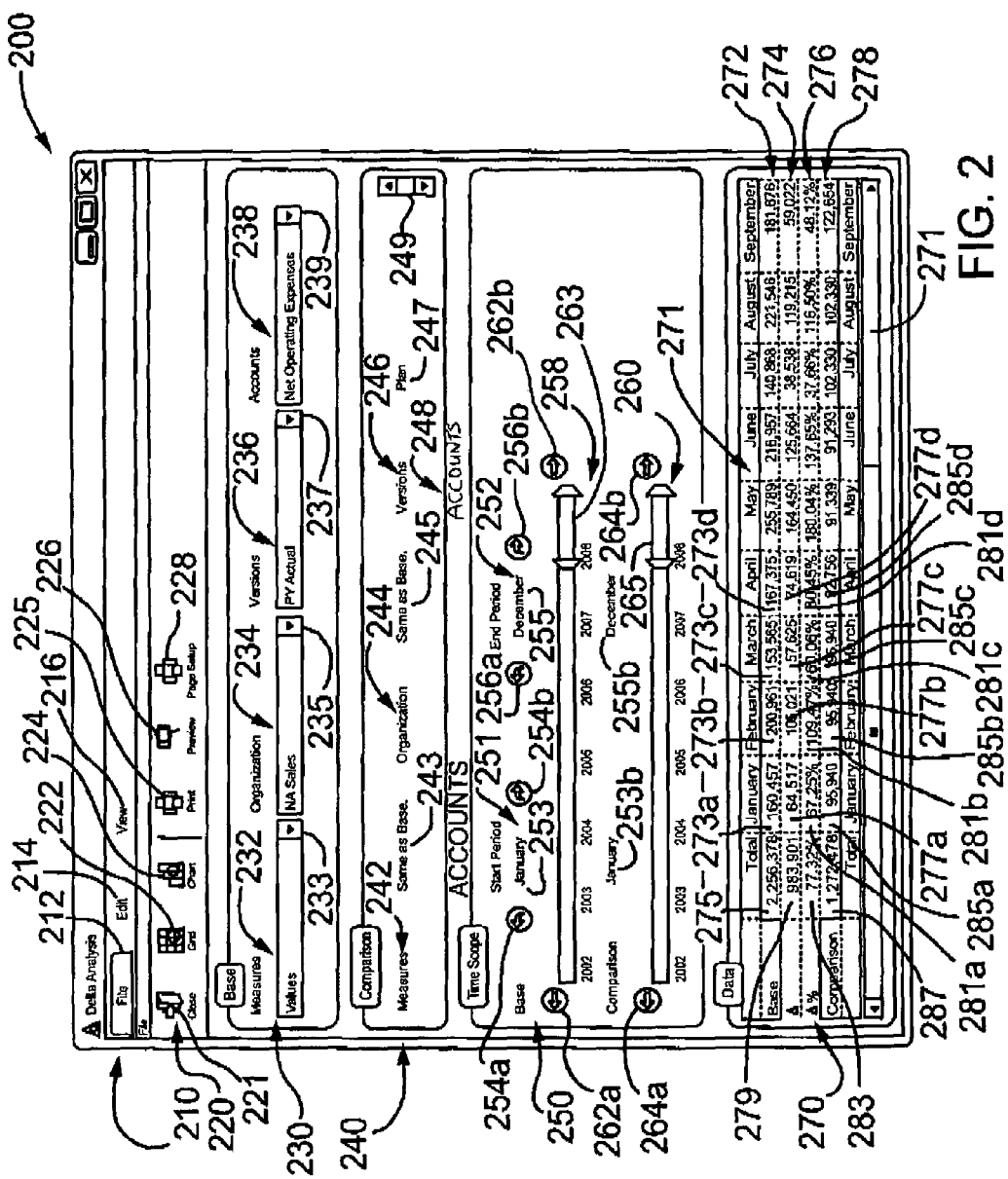
FIG. 2 is an exemplary screen shot of a data analysis processor screen for configuring the data processor according to an embodiment of the invention.

According to an embodiment, the data analysis module 128 is configured with a graphical user interface or GUI comprising a data analysis screen or window as shown in FIG. 2 and indicated generally by reference 200. According to an embodiment, the data analysis module 128 and the data analysis screen 200 are configured to provide a user with a mechanism to look at any cell in a report screen, and according to an embodiment the data analysis module 128 is configured to provide a time vector (e.g. a default time vector) associated with the selected cell and according to another aspect, the data analysis module 128 and the data analysis screen 200 are configured to provide the user with a mechanism for defining a comparison vector and performing comparison operations between the base and comparison vectors, as will be described in more detail below.

Figure 3:
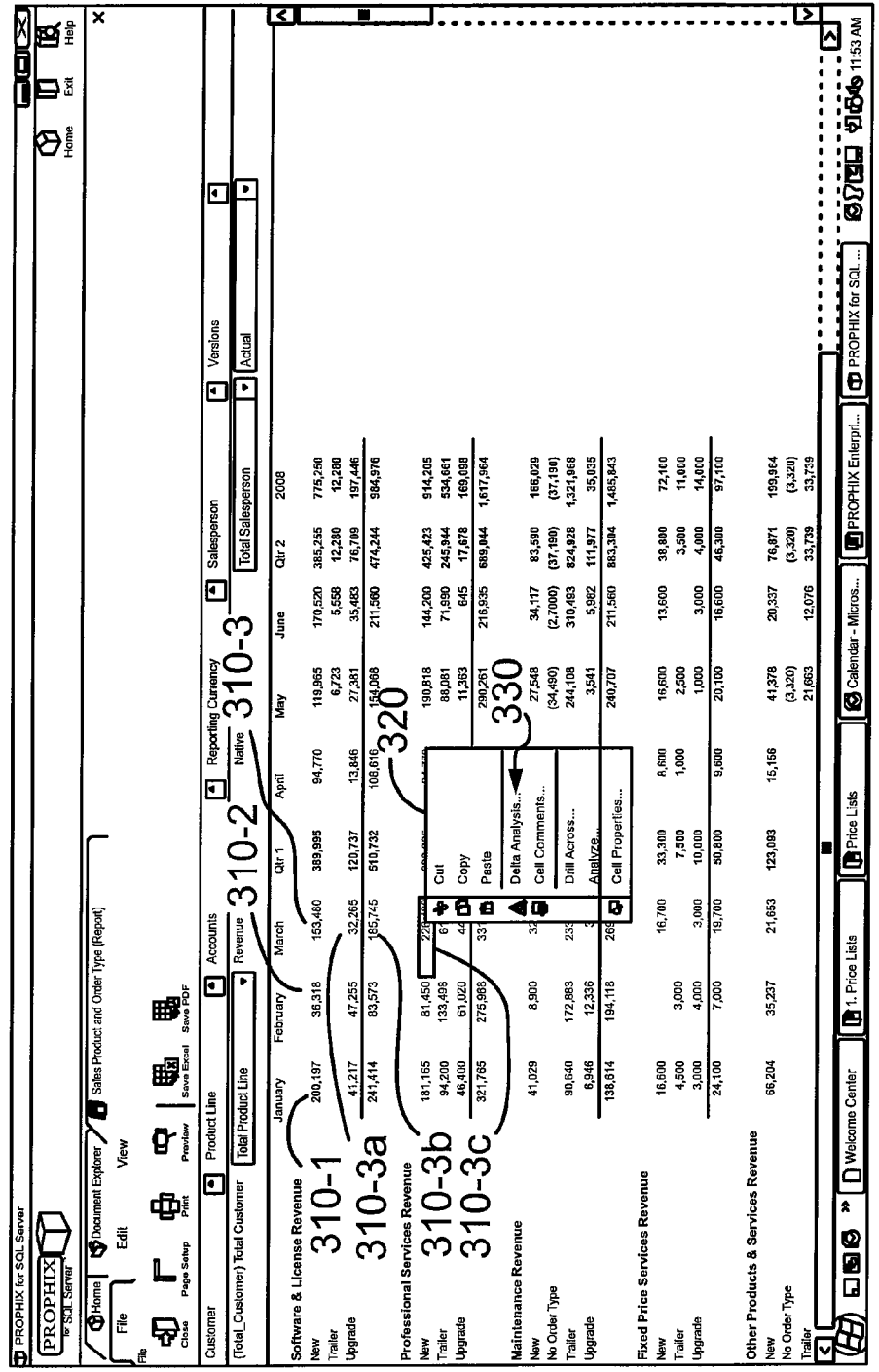
FIG. 3 is an exemplary screen shot of a "Template Style" report screen configured for accessing the data analysis processor according to an embodiment of the invention.

According to an embodiment, the data analysis screen 200 is accessed or displayed in response to a data object or cell being "clicked" (e.g. a "right-click" using a mouse or other input device). For example, FIG. 3 shows a screenshot of a "Template Style" Report indicated generally by reference 300. The Template Style report 300 comprises an exemplary report for revenue streams associated with a software product line and is arranged in rows and columns as shown in FIG. 3. According to this aspect, each revenue number 310 in the report 300 comprises an active data object and corresponds to a cell or a tuple in the cube 142. For example, the revenue number for the month of "March" for the "Professional Services Revenue" comprises a data object indicated by reference 310-3c. According to an embodiment, the data objects comprise active elements and are responsive to a user activated device, e.g. a mouse, and in response to a mouse click, the application 122 (FIG. 1) is configured to display a drop-down menu box 320 having a form as shown in FIG. 3. According to an embodiment, the drop-down menu box 320 includes a "Delta Analysis" menu item indicated by reference 330. Selecting or "clicking" the Delta Analysis menu item 330 causes the application 122 to display the data analysis screen 200 as shown in FIG. 2.

Figure 4:
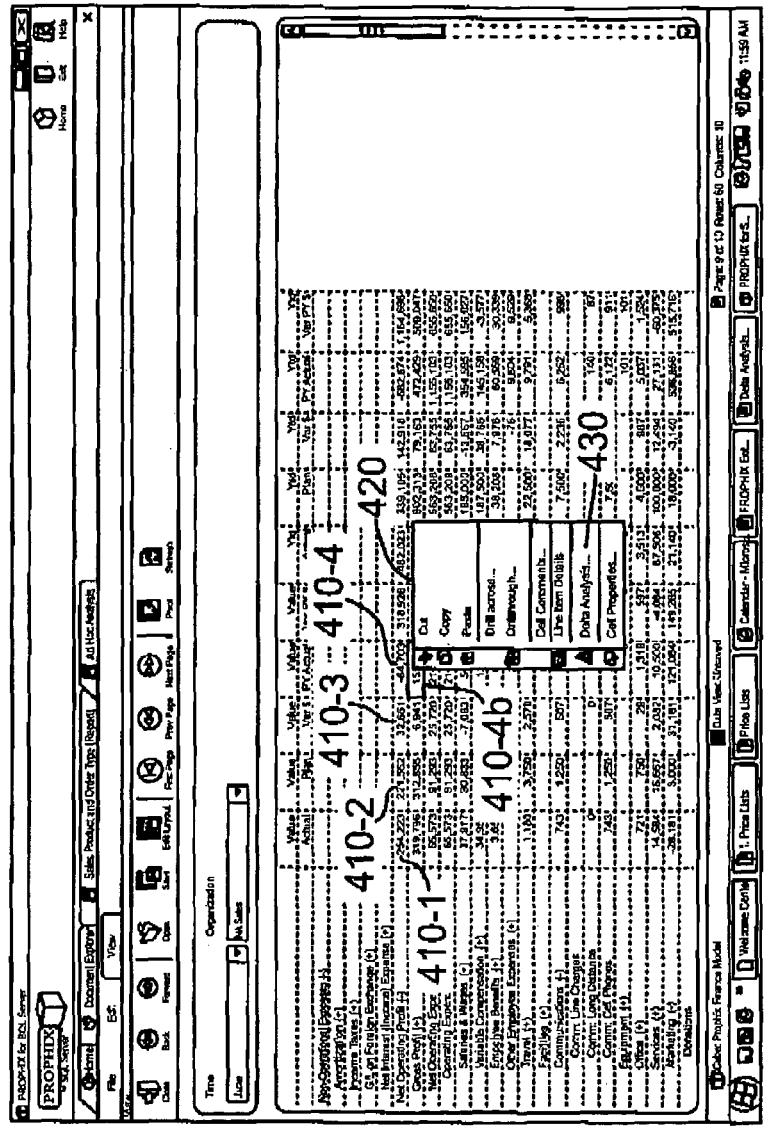
FIG. 4 is an exemplary screen shot of an "Ad Hoc" report screen configured for accessing the data analysis processor according to an embodiment of the invention.

Reference is also made to FIG. 4, which shows an "Ad Hoc" style report screen indicated generally by reference 400. The Ad Hoc report screen 400 is another report style that is supported by the application 122. The Ad Hoc report screen 400 comprises financial data arranged in columns and rows and is configured to allow a user to quickly populate and modify data entries, e.g. line items. According to an embodiment, the line items in the Ad Hoc report screen 400 comprise active data objects indicated generally by reference 410. In a manner similar to the Template Style report screen 300, the data objects 410 are configured to be responsive to a user input device, e.g. a mouse, and in response to being clicked, the application is configured to display a drop-down menu box 420 having a Delta Analysis menu item 430 as shown in FIG. 4. The application is configured to display the data analysis screen 200 in response to the Delta Analysis menu item 430 being clicked or selected by the user.

Reference is made back to FIG. 2. According to an embodiment, the data analysis screen 200 comprises a menu bar 210, a tool bar 220, a "Base" vector panel 230, a "Comparison" vector panel 240, a "Time Scope" configuration panel 250 and a Data display window 270. The menu bar 210 is configured with "File" tab 212, an "Edit" tab 214, and a "View" tab 216. The tabs allow a user to switch or move between screens and the layouts of certain screens will change depending on the options selected in the other tabs, as will be described in more detail below.

As shown in FIG. 2, the tool bar 220 is configured with a "Close" button 221, a "Grid" display button 222, and a "Chart" display button 224. In "File" mode, the tool bar 220 is also configured with file management tools comprising a "Print" button 225, a "Preview" button 226 and a "Page Setup" button 228.

Figure 6:
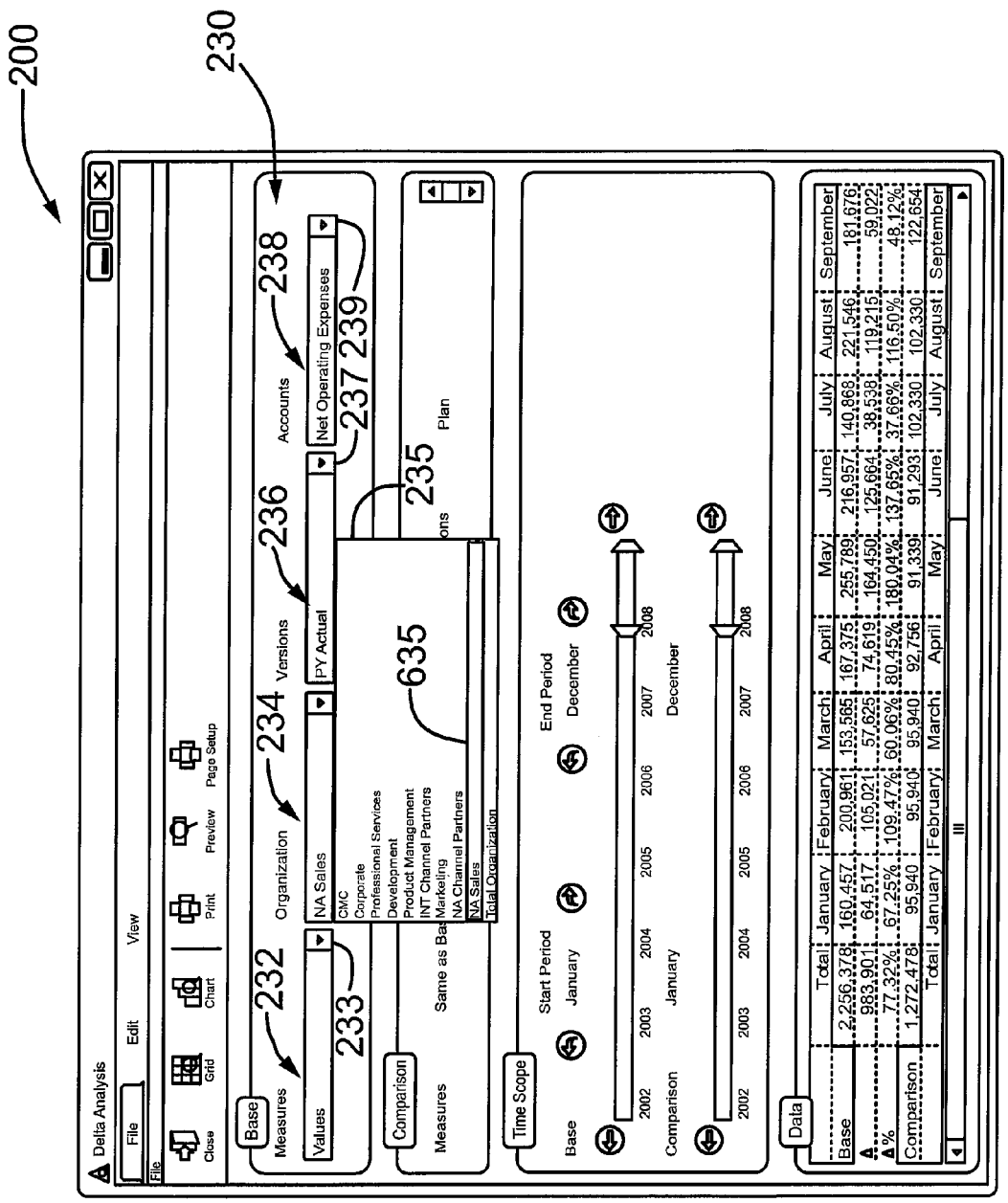
FIG. 6 is an exemplary screen shot of the delta processor configured for selecting base vector dimension members.

The Base vector panel 230 is configured to show the dimensions for the vector associated with the selected data cell. The exemplary base vector depicted in FIG. 2 comprises the following dimensions: a "Measures" dimension indicated by reference 232, an "Organization" dimension indicated by reference 234, a "Versions" dimension indicated by reference 236, and an "Accounts" dimension indicated by reference 238. According to an embodiment, each of the dimensions includes a drop-down list which lists the members associated with the dimension. For example, the Measures dimension 232 comprises a members drop-down list indicated by reference 233 with "Value" showing as the selected member; the Organization dimension 234 comprises a members drop-down list indicated by reference 235 with "NA Sales" showing as the selected member; the Versions dimension 236 comprises a members drop-down list indicated by reference 237 with "PY Actual" showing as the selected member; and the Accounts dimension 238 comprises a members drop-down list indicated by reference 239 with "Net Operating Expenses" showing as the selected member. The members drop-down list 235 for the "Organization" dimension 234 is shown in expanded form in FIG. 6 and indicated by reference 235'. As shown in FIG. 6, the members for the Organization dimension 234 comprise the following entities: "CMC", "Corporate", "Professional Services", "Development", "Product Management", "INT Channel Partners", "Marketing", "NA Channel Partners", "NA Sales" (selected by mouse as indicated by reference 635), and "Total Organization". The data analysis processor 128 is configured to read data from cells (i.e. tuples) in the cube based on the members (i.e. 233, 235, 237 or 239) selected for the Dimensions (i.e. 232, 234, 236 or 238) specified in the base vector panel 230 for example as shown in FIG. 2.

Referring back to FIG. 2, the comparison vector panel 240 is configured to select members from the dimensions associated with the comparison vector. According to an embodiment, the comparison vector is configured with the same dimensions as the base vector. For the example configuration depicted in FIG. 2, the comparison vector comprises a "Measures" dimension 242 (corresponding to the Measures dimension 232 in the base vector), an "Organization" dimension 244 (corresponding to the Organization dimension 234 in the base vector), a "Versions" dimension 246 (corresponding to the Versions dimension 236 in the base vector) and an "Accounts" dimension 248 (accessible using GUI scroll bar 249. According to an embodiment, each of the dimensions for the comparison vector includes a respective active data object that shows the selected member for the associated dimension. For the example configuration depicted in FIG. 2, the Measures dimension 242 has a selected member 243 "Same as Base" which indicates that the member is the same as the base member, i.e. the "Value" member 233. The Organization dimension 244 also has a member 245 "Same as Base" which is the same as the selected member for the corresponding base member dimension, i.e. the "NA Sales" member 235. For the Versions dimension 246, the selected member is "Plan" as indicated by the displayed data object 247.

According to an embodiment, the comparison vector 240 is populated with data according to the Version dimension 246. For the example, as depicted in FIG. 2, the Version dimension 246 is configured for the "Plan" member 247, and accordingly, the data processor module 128 populates the comparison vector (for example, row 278 in the data display window 270) with "Plan" data values, i.e. data values that were previously reviewed. According to another aspect, the comparison vector may be configured with other members 247 of the Version dimension 246, for example, "Actual" or "Forecast".

According to an embodiment, the data analysis processor 128 is configured to extend any changes in the dimensions of the base vector 230 to the comparison vector 240 when the active data object for the corresponding dimension in the comparison vector 230 is set to "Same as Base" as described above and indicated for the Measures dimension 242 and the Organization dimension 244 in FIG. 2.

Figure 16:
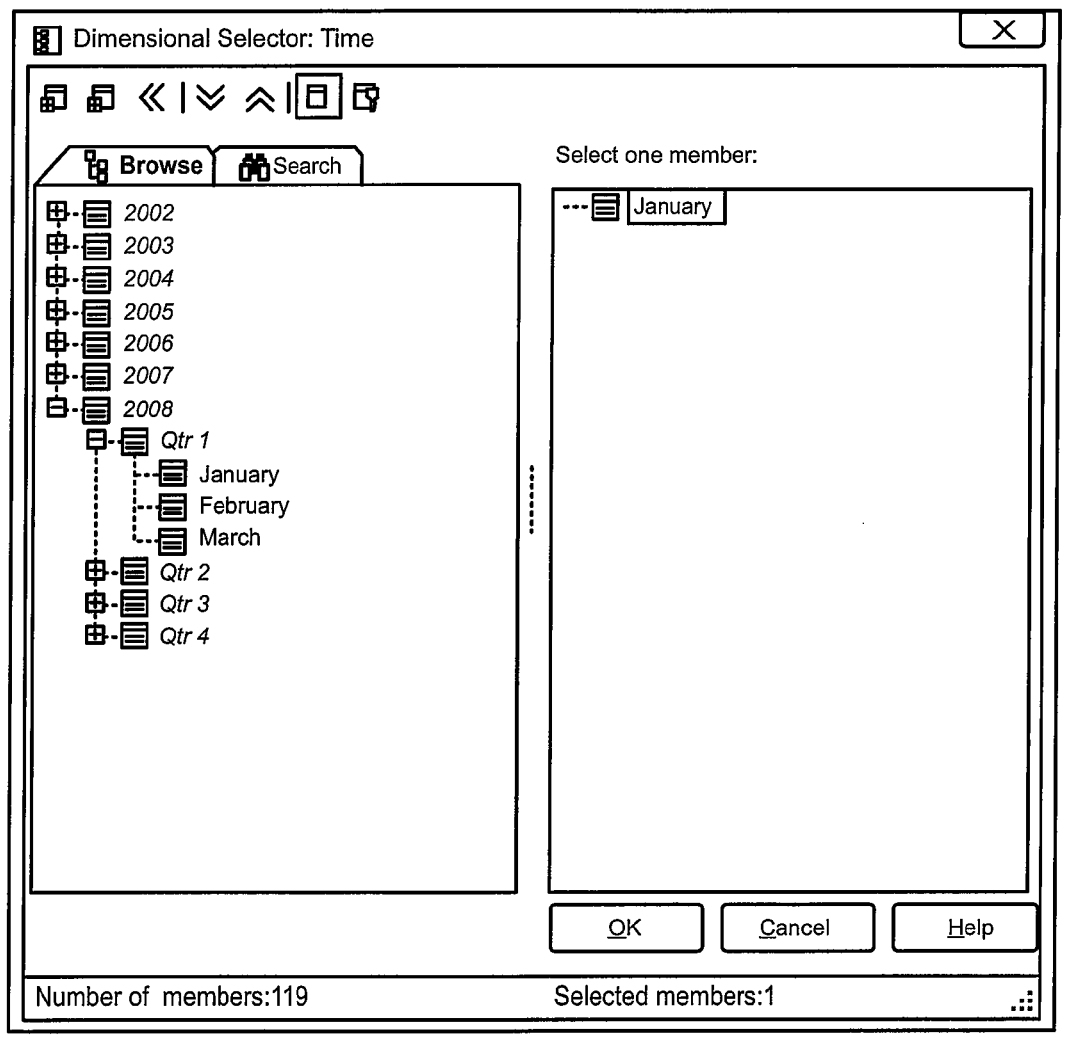
FIG. 16 is an exemplary screen shot of a dialog box configured for specifying a time dimension in accordance with an embodiment of the present invention.

The base vector 230 includes a time dimension and according to an embodiment, the Time Scope panel 250 is configured for setting the time frame for the base vector 230 and the comparison vector 240. According to an embodiment, the time scope panel 250 includes a Base Start Period setting control 251 and an Base End Period setting control 252. According to an embodiment, the Start Period setting control 251 comprises an active text field or object 253, a go back button 254a and a go forward button 254b. Similarly, the End Period setting control 252 comprises an active text field or object 255, a go back button 256a and a go forward button 256b. The active text fields 253, 255 are configured to be responsive to a mouse click or other input device and display a list of start/end periods (e.g. months), for example, in the form of a Time Dimension select dialog box 1600 as depicted in FIG. 16. The selected start/end period is displayed in the respective active text field 253, 255. Clicking the go forward 254b, 256b buttons or the go back buttons 254a, 256a allows a user to change the selected start/end periods. In order to provide a valid comparison, the periodicity (e.g. monthly, quarterly, and yearly) for the comparison vector 240 must be the same as that for the base vector 230 as indicated by the respective text fields 253b and 255b. According to another aspect, the time scope panel 250 includes a time slider bar 258 for the base vector 230 and a corresponding time slider bar 260 for the comparison vector 240. As shown, the time slider bar 258 is configured with a go back button 262a, a go forward button 262b, and a slider control 263 for changing or modifying the time scope for the base vector 230. Similarly, the time slider bar 260 for the comparison vector 240 is configured with a go back button 264a, a go forward button 264b, and a slider control 265 for changing or modifying the time scope for the comparison vector 240.

According to an embodiment, the data analysis processor 128 is configured with one or more functions or software components configured to determine an initial time scope as follows:

if there is only one level in the time dimension, then the time scope is all time members and the periodicity is that of the single level;

otherwise, if the number of leaf descendants of the selected member is 13 or less, then the time scope is from the first leaf descendant to the last leaf descendant of the selected member and the periodicity is the same as that of the leaf members of the selected member;

otherwise, if the selected member is a leaf member and the number of leaf members of the year containing the selected member is 13 or less, then the time scope is the entire year containing the selected member and the periodicity is the same as that of the selected member;

otherwise, if the selected member is a leaf member, then the time scope is the parent of the selected member and the periodicity is the same as the selected member;

otherwise, the time scope is that of the selected member and the periodicity is the same as the children of the selected member.

Referring again to FIG. 2, the data display window 270 according to an embodiment is configured to provide two types of data displays: a grid or tabular display and a chart display. The data analysis screen 200 is configured to allow a user to switch between the grid and chart displays using the "Grid" button 222 and the "Chart" button 224. For the configuration shown in FIGS. 2 and 6, the data display window 270 comprises a grid display as indicated by reference 271 with data values and other parameters arranged in rows and columns. As shown in FIG. 2, the grid display 271 comprises a "Base" row 272, a delta row or vector 274, a delta % row or vector 276, and a comparison row or vector 278.

The base row 272 corresponds to the base vector 230 and comprises columns or data cells, i.e. data values, 273 indicated individually by references 273a, 273b, 273c, 273d, ..., which comprise a data value in a cell in the cube corresponding to the dimensions and members selected for the base vector in the base vector panel 230. The columns of the data cells 273 are configured according to the time base (i.e. time scope and/or periodicity parameters) defined in the time scope panel 250 as described in more detail below. As shown, the base row 272 also includes a "Total" column indicated by reference 275. The total column 275 comprises the total value, i.e. summed value, of the values in the data columns 273 and would also include any data columns not visible in the window 270 (i.e. accessible using a scroll bar 271). According to an embodiment, the data cells or columns 273, 275 may be altered as described in more detail below.

The delta row 274 comprises columns or data cells 277, indicated individually by references 277a, 277b, 277c, 277d, ..., and a "Total" column indicated by reference 279. The delta row 274 corresponds to the base vector 240 and will have the same dimensions as the base vector 230. The data cells 277 and the total column 279 in the delta row 274 are editable by the user and will contain data values selected or configured for performing or executing "delta analysis" operation as described in more detail below.

The delta % row or vector 276 comprises columns or data cells 281, indicated individually by references 281a, 281b, 281c, 281d, .... As shown in FIG. 2, the delta % row 276 also includes and a "Total" column indicated by reference 283. According to an embodiment, the data analysis processor 128 is configured with a function or software component that calculates the relative percentage of the data in the columns 277 and 279 of the delta row 275 and the respective data in the columns 285 and 287 in the comparison row vector 278. Operation of the delta % according to embodiments of the invention is described in more detail below. According an embodiment, the data analysis processor 128 is configured with a function or software process to "spread" data entered in the Total column 283 across the data cells 281 of the delta % row 276, as described in more detail below. In a business application, the delta % values can be used, for example, as part of an analysis which is used to calculate "year-on-year" percentage cost increases or percentage variations between "Planned" (i.e. corresponding to the comparison vector row 278) and "Actual" (i.e. corresponding to the base vector row 272).

The comparison row 278 corresponds to the comparison vector 240 and comprises columns or data cells 285, indicated individually by references 285a, 285b, 285c, 285d, .... As shown, the comparison row 278 includes a "Total" column indicated by reference 287. The comparison row 278 has the same dimensions and time scope as the base row 272 (i.e. the base vector 230). According to an embodiment, the data analysis processor 128 is configured to apply a delta analysis comprising the difference between the respective columns in the base row 272 and the comparison row 278, and the resulting data values are shown in the respective columns 277, 279 of the delta row 274. According to an embodiment, the columns or data cells 277 of the delta row 274 are editable or modifiable, and the data analysis processor 128 is configured to calculate the change(s) in the base row 272 resulting from a change in one or more of the columns 277 of the delta row 274. According to another aspect, the data analysis processor 128 is configured with a function or software process to "spread" data entered in the Total column 279 across the data cells 277 of the delta row 274, as described in more detail below. According to another embodiment, the columns or data cells 273 and 275 of the base row 272 are editable or modifiable, and the data analysis processor 128 is configured to calculate the change(s) in the delta row 274 resulting from a change in one or more of the columns 273, 275 of the base row 272. According to another embodiment, the application 122 (FIG. 1) is configured to store the base row 272 (i.e. the base vector 230) in the cube 142 (FIG. 1), for example, when the data analysis screen 200 is closed, and according to another aspect, the application 122 is configured to display the base vector in a report screen 1500 as a new row indicated by reference 1510 in FIG. 15.

According to an embodiment, the data analysis processor 128 is configured with one or more functions or software components to perform the following calculations and operations:

(1) Delta row (274)=Base row (272)−Comparison row (278)

Delta % row (276)=Delta row (274)/Comparison row (278)

(2) Order of calculations when the display window 270 is refreshed with data, i.e. populated with data from the cube:

Total Base (275)=sum/average/last/first of other data cells in the base row; if the time conversion method for the account is 'formula', the total is set to be blank Total Comparison (287)=sum/average/last/first of the other data cells in the comparison row; of the time conversion method for the account is 'formula', the total is set to be blank for all data cells (including total), Delta=Base−Comparison for all data cells (including total), Delta %=Delta/Comparison (3) Order of calculation when data is entered (i.e. by the user):

(a) for non-total data cells, the calculations are configured as follows:

if Base is Entered,
Delta=Base−Comparison
Delta %=Delta/Comparison if Delta values are entered,
Base=Delta+Comparison
Delta %=Delta/Comparison if Delta % values are entered,
Delta=Delta %*Comparison
Base=Delta+Comparison Total Base=sum/average/last/first of other data cells in Base Total Delta=Total Base−Total Comparison Total Delta %=Total Delta/Total Comparison (b) for "total" data cells, the calculations are configured as follows:

if Total Base is entered:
spread Base total (if account has time conversion method of sum; copy for all other time conversion methods) to all other Base cells except those that are not available for data entry or locked for altered cells (including total), Delta=Base−Comparison for all altered cells (including total), Delta %=Delta/Comparison if Total Delta is entered:
Total Base=Total Delta+Total Comparison
spread Base total (if account has time conversion method of sum; copy for all other time conversion methods) to all other Base cells except those that are not available for data entry or locked
    for altered cells (excluding total), Delta=Base−Comparison
    for altered cells (including total), Delta %=Delta/Comparison
if Total Delta % is entered:
    Total Delta=Delta %*Comparison
    Total Base=Delta+Comparison
    spread (if account has time conversion method of sum; copy for all other time conversion methods) Base total to all other Base cells except those that are not available for data entry or locked
    for altered cells (excluding total), Delta=Base−Comparison
    for altered cells (excluding total), Delta %=Delta/Comparison The particular implementation and coding details for the operation of the data analysis processor 128 as described above will be within the understanding of one skilled in the art.

Figure 5:
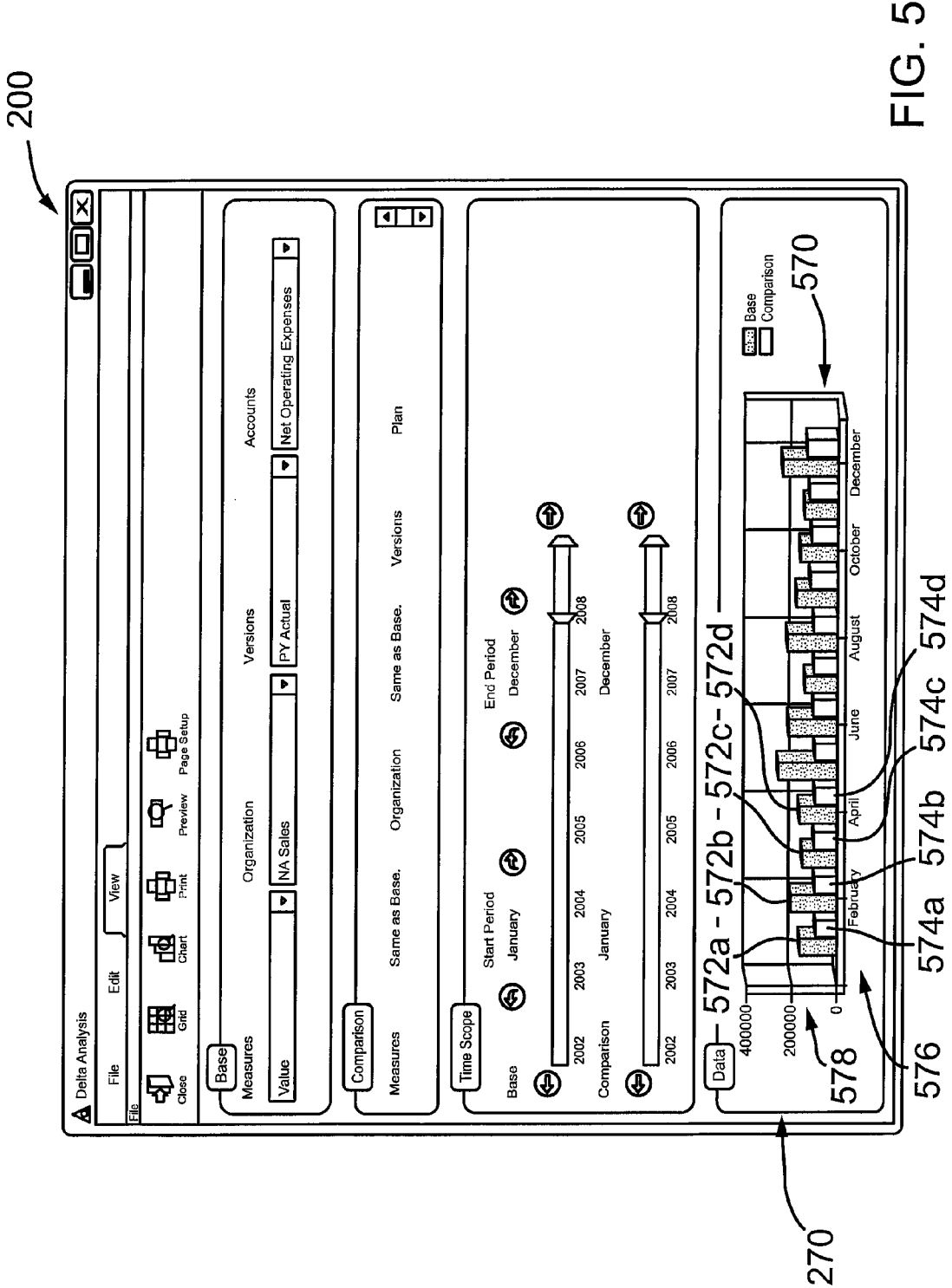
FIG. 5 is an exemplary screen shot of the delta processor configured with a chart display option or mode in accordance with an embodiment of the invention.
Figure 8:
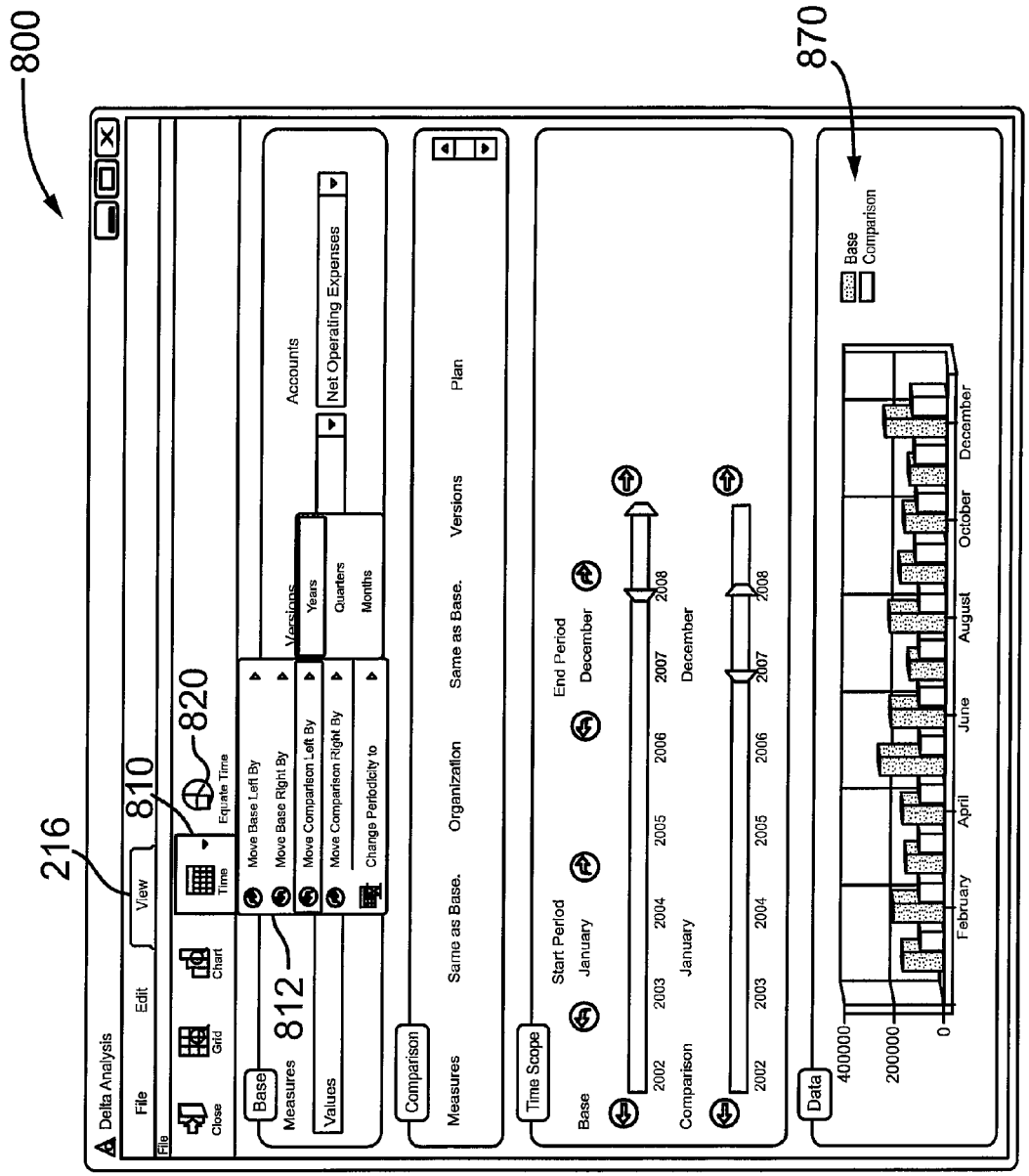
FIG. 8 is an exemplary screen shot of the delta processor configured for changing a time base parameter for the base vector or comparison vectors in accordance with an embodiment.

The data display window 270 configured with a chart display is shown in FIGS. 5 and 8, and indicated generally by references 570 and 870, respectively. As shown in FIG. 5, the Chart Display comprises a graphical representation of the base vector elements 572, indicated individually by references 572a, 572b, 572c, 572d, . . . and a graphical representation of the comparison vector elements 574, indicated individually by references 574a, 574b, 574c, 574d, . . . . As depicted in FIG. 5, the Chart Display 570 comprises a horizontal axis 576 (configured for time, e.g. months, corresponding to the periodicity specified for the base vector) and a vertical axis 578 (configured in dollar amounts).

FIG. 8 shows a "View" screen 800 according to an embodiment of the invention. According to an embodiment, the View screen 800 is configured to allow a user to view the delta analysis and change the time scope and periodicity, but not the dimensions/members associated with the base and comparison vectors. The View screen 800 is invoked by clicking the "View" menu button 216. According to another embodiment, the time scope and periodicity for the base and comparison vectors can be set or modified using a "Time" button 810 as shown on a "View" screen 800 depicted in FIG. 8. According to an embodiment, the data analysis processor 128 is configured to display a drop-down list box 812 having a format as shown in FIG. 8. As shown, the drop-down list box 812 is configured to change the time scope for both the base vector and the comparison vector and also configured to change the periodicity. According to an embodiment, the View screen 800 is configured with an "Equate Time" button indicated by reference 820. Clicking the Equate Time button 820 results in the time scope of the comparison vector being changed to the same time scope as that for the base vector.

Figure 9:
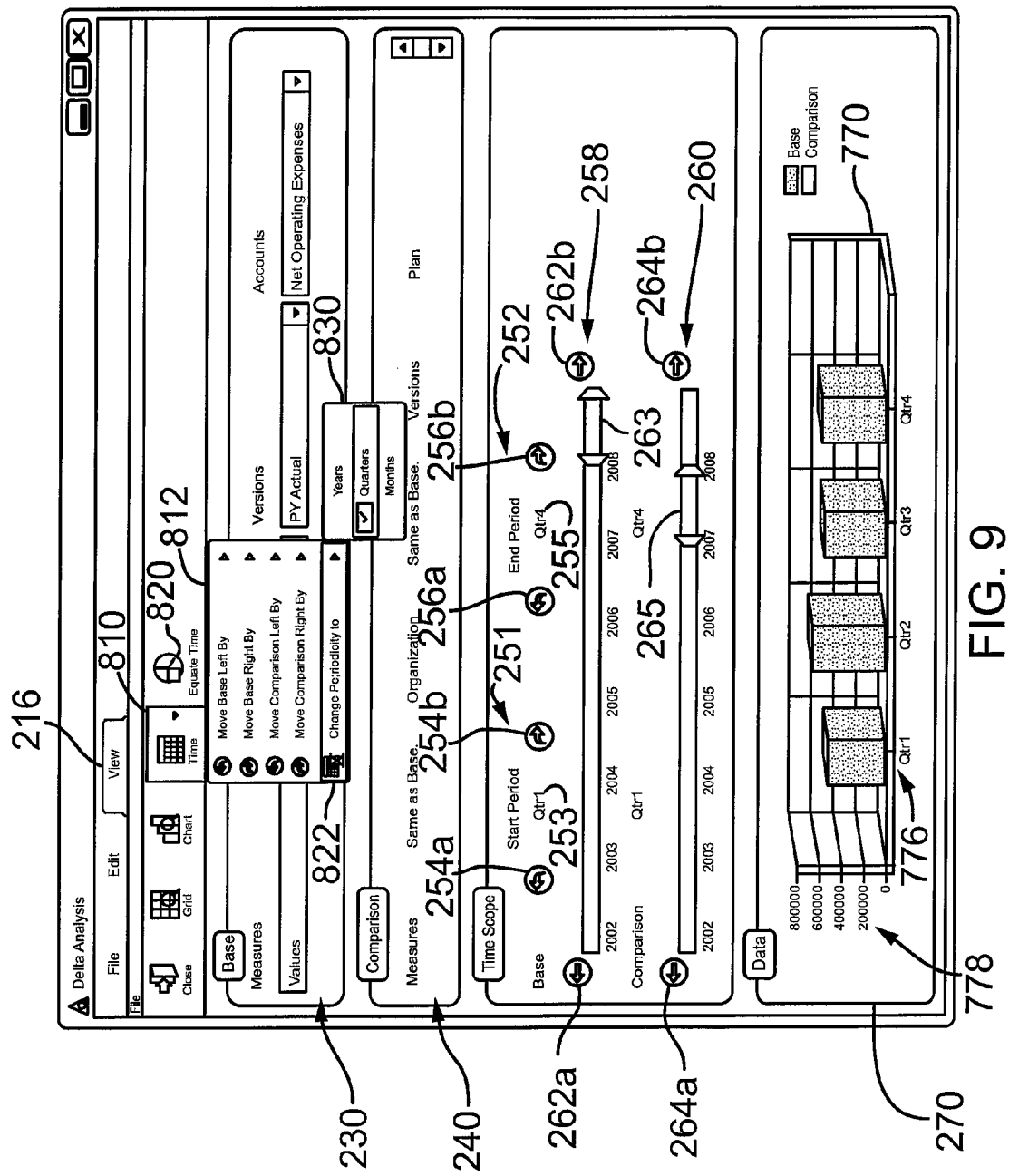
FIG. 9 is an exemplary screen shot of the delta processor configured for changing a periodicity parameter for the base vector or comparison vectors in accordance with an embodiment.

Reference is next made to FIG. 9, which shows the View screen configured for changing the periodicity of the base vector 230 and the comparison vector 240 in accordance with another example. As shown in FIG. 9, the drop-down list box 812 is displayed and the "Change Periodicity to" menu item 822 is selected and an associated sub-list box 830 showing the periodicity options is displayed. According to an embodiment, the periodicity options include "Years", "Quarters", and "Months", and in this example, the periodicity has been changed to "Quarters". In response to the selection of a quarterly period, the data analysis processor 128 is configured to change the active text field 253 for the Start Period to display "Qtr1" and the active text field 255 for the End Period to display "Qtr4". The data analysis processor 128 also executes a function or software object to change the horizontal time axis 776 in the chart display 770 (also comprising the vertical axis 778) to show quarters, i.e. "Qtr1", "Qtr2", "Qtr3" and "Qtr4". According to another embodiment, the periodicity may include days, and in general, the periodicity is based on the periodicity (i.e. time dimension) of the data stored in the cube.

Figure 10:
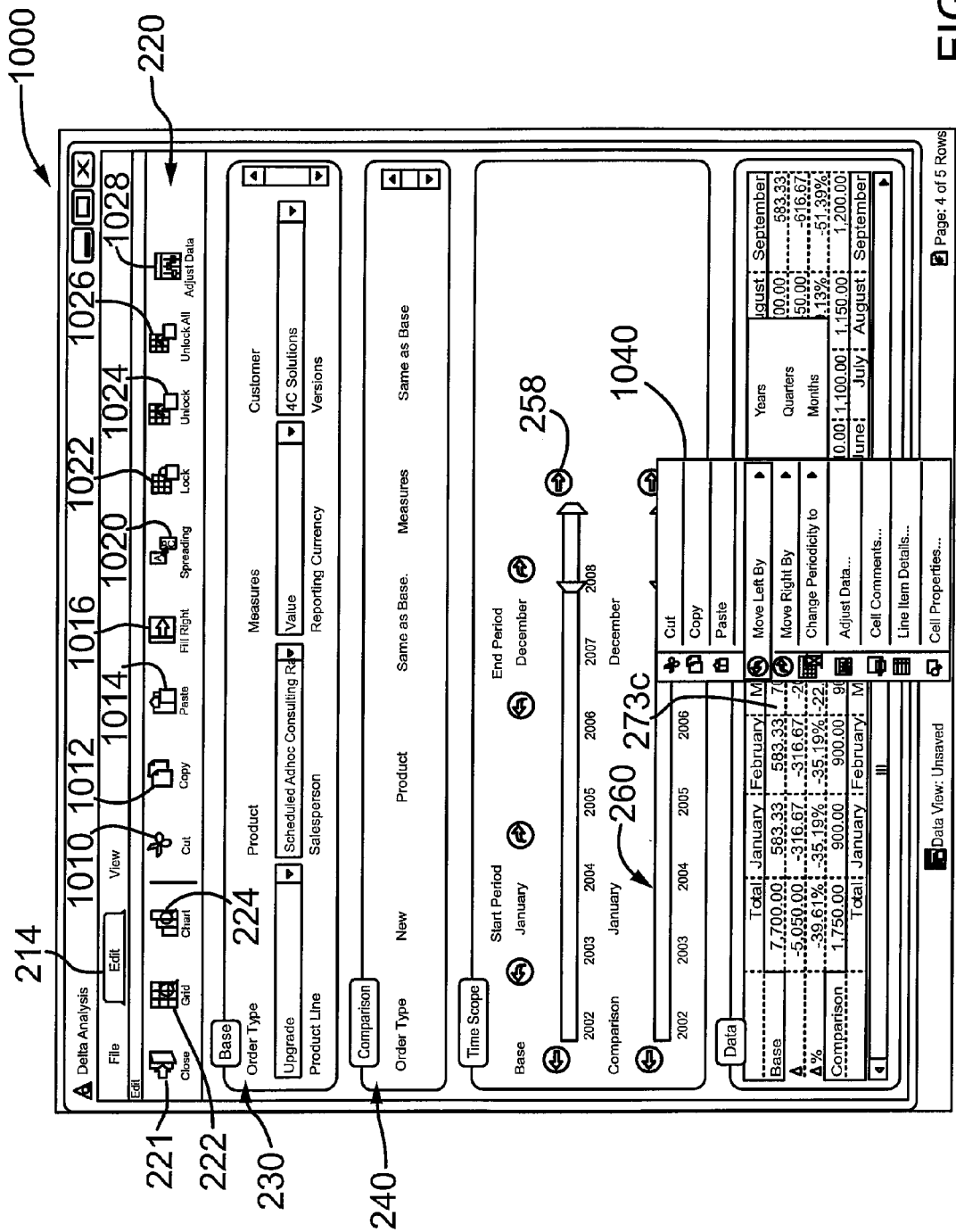
FIG. 10 is an exemplary screen shot of the delta processor configured with a time scope control panel for specifying a time scope parameter and/or a periodicity parameter according to an embodiment.

Reference is next made to FIG. 10, which shows a mechanism according to another embodiment for configuring or modifying time scope and/or periodicity for the base 230 and comparison 240 vectors. According to an embodiment, the mechanism comprises a drop-down list box indicated by reference 1040. FIG. 10 shows an "Edit" screen indicated generally by reference 1000. The Edit screen 1000 is invoked by clicking the "Edit" menu tab 214. The Edit screen 1000 is configured to allow editing operations for the base 272, delta 274 and delta % 276 rows. In "Edit" mode and as shown in FIG. 10, the tool bar 220 is configured with editing tools comprising a "Cut" button 1010, a "Copy" button 1012, a "Paste" button 1014, and a "Fill Right" button 1016. The tool bar 220 is also configured with data processing tools comprising a "Spreading" function button 1020, a data cell "Lock" button 1022, a data cell "Unlock" button 1024, an "Unlock All" button 1026, and an "Adjust Data" button 1028. The functionality associated with these controls is described in more detail below.

Referring still to FIG. 10, the data analysis processor 128 is configured to display the drop-down list box 1040 in response to a data cell (e.g. data cell 273c as shown in FIG. 10) being clicked on the grid 272 (e.g. right clicked by a mouse or other type of pointer device). The drop-down list box 1040 is configured to change the time scope for both the base vector and the comparison vector and also configured to change the periodicity.

Figure 7:
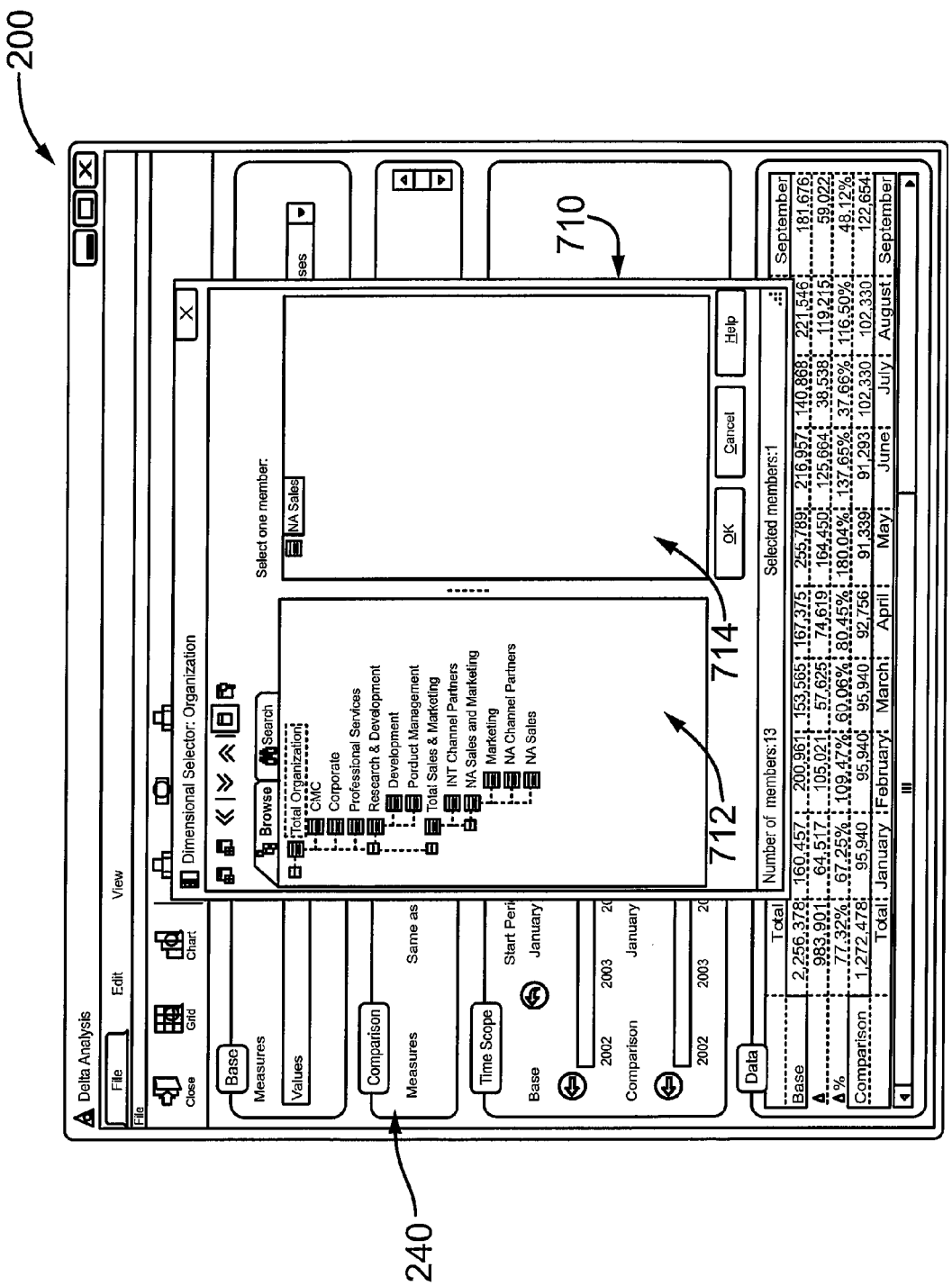
FIG. 7 is an exemplary screen shot of the delta processor configured with a Dimension Selector for selecting comparison vector dimension members according to an embodiment.

Reference is next made to FIG. 7, which shows a dialog box 710 configured for selecting members for a dimension associated with the comparison vector 240. According to an embodiment, the data analysis processor 128 is configured to display the dialog box 710 in response to one of the dimension objects for the comparison vector being clicked in the comparison vector panel 240 (FIG. 2). For the exemplary configuration depicted in FIG. 7, the Organization dimension 244 (FIG. 2) has been clicked and the dialog box 710 configured for the Organization dimension is displayed. According to an embodiment, the dimension members are displayed in a hierarchical file structure as shown in FIG. 7 in a window 712 in the dialog box 710, and the selected member(s) are displayed in a separate window 714 and may be manipulated using conventional graphical user interface (e.g. Windows) navigation techniques.

Figure 11A:
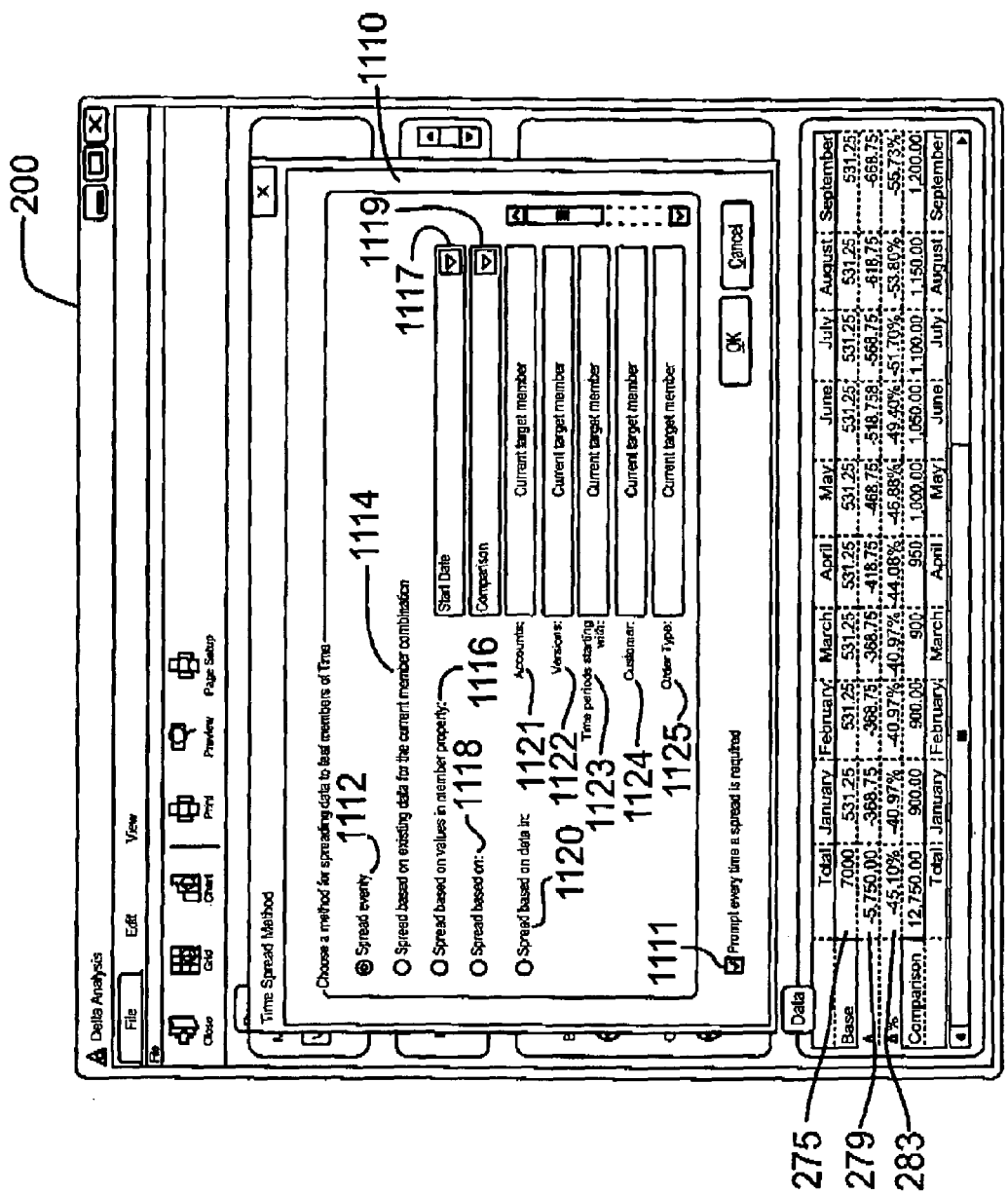
FIG. 11(*a*) is an exemplary screen shot of the delta processor configured with a dialog box for specifying a time spread process for a Total data entry in accordance with an embodiment.

Reference is next made to FIG. 11(a), which shows a time spread mechanism according to an embodiment of the invention. The data analysis processor 128 includes a function or software component configured to display a Time Spread Method dialog box 1110 having a form as shown in FIG. 11(a). According to an embodiment, the data analysis processor 128 is configured to display the dialog box 1110 when data is entered in the "Total" column, i.e. a data value is entered in the Base total column 275, the Delta total column 279 or the Delta % total column 283. According to an embodiment, the dialog box 1110 is displayed every time a spread operation is initiated. This default state can be disabled by unclicking a checkbox 1111 in the dialog box 1110. If the prompting is turned off, then the data analysis processor 128 is configured to display a Prompting notification dialog box 1190 having a form as shown in FIG. 11(d).

Referring to FIG. 11(a), the dialog box 1110 is configured provide one or more techniques for spreading the data (i.e. the total data value) to the other data cells in the base vector according to time. According to an embodiment, the spread options are selected using a radio button and comprise: "Spread Evenly" 1112, "Spread based on existing data for the current member combination" 1114, "Spread based on values in member property:" 1116, "Spread based on:" 1118, or "Spread based on data in" 1120. The selection for "Spread based on values in member property:" 1116 includes a drop-down list box 1117 for selecting a property associated with the member property, for example, "Start Date" or "Weeks in the Month". The selection for "Spread based on:" 1118 includes a drop-down list box 1119 for selecting spread parameters, for example, "Comparison" as is spread in the comparison vector 240. The selection for the "Spread based on data in" 1120 includes a drop-down list box for each dimension for selecting one of the members associated with the dimension. As shown, the dialog box 1110 is configured with a drop-down list box 1121 for the "Accounts" dimension, a drop-down list box 1122 for the "Versions" dimension, a drop-down list box 1123 for the "Time periods" dimension, a drop-down list box 1124 for the "Customer" dimension, and a drop-down list box 1125 for the "Order Type" dimension.

Figure 11B:
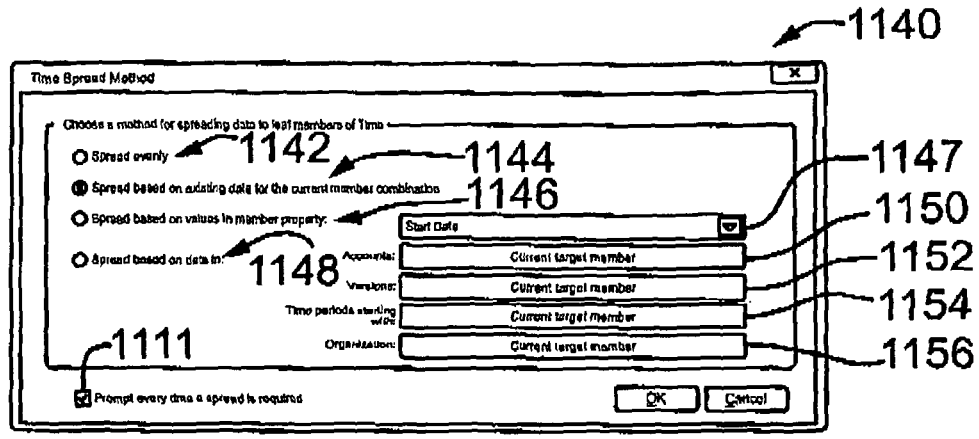

Reference is next made to FIG. 11(b), which shows a dialog box 1140 for a dimension spread mechanism according to an embodiment of the invention. According to an embodiment, the data analysis processor 128 is configured to display the dimension spread dialog box 1140:

(1) if data is entered at a non-Total level in the base row, the delta row or the delta % row; and (2) if the time period for which the data is entered is not a leaf member According to an embodiment, the dimension spread options are selected using a radio button and comprise: "Spread Evenly" 1142, "Spread based on existing data for the current member combination" 1144, a "Spread based on values in member property" 1146, or "Spread based on data in" 1148. The selection for "Spread based on values in member property:" 1146 includes a drop-down list box 1147 for selecting a property associated with the member property, for example, "Start Date", or for example, "Target Billing Hours per Month". The selection for the "Spread based on data in" 1148 includes a drop-down list box for each dimension for selecting one of the members associated with the dimension. As shown, the dialog box 1140 is configured with a drop-down list box 1150 for the "Accounts" dimension, a drop-down list box 1152 for the "Versions" dimension, a drop-down list box 1154 for the "Time periods starting with" dimension, and a drop-down list box 1156 for the "Organization" dimension. As shown, the dialog box 1140 also includes the checkbox 1112 for enabling/disabling the dialog box prompting.

Figure 11C:
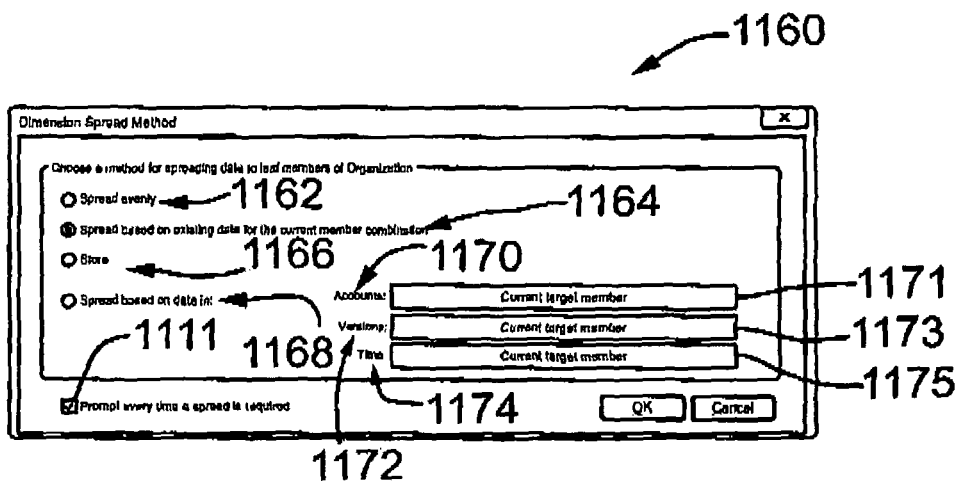
Figure 11D:
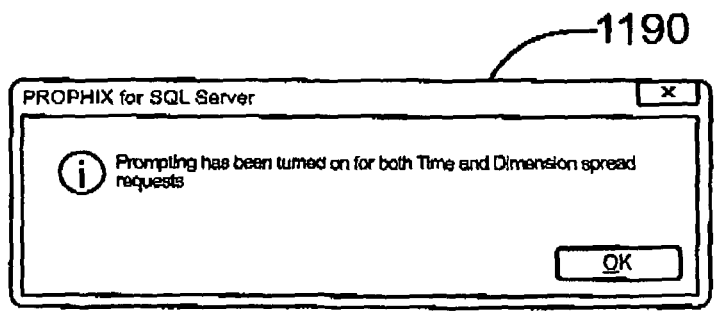

Reference is next made to FIG. 11(c), which shows a dialog box 1160 for a dimension spread mechanism. According to an embodiment, the data analysis processor 128 is configured to display the dimension spread dialog box 1160 if any one of the selected non-Time dimensions for the base vector 230 (FIG. 2) is not a leaf member. According to an embodiment, the dimension spread options are selected using a radio button and comprise: "Spread Evenly" 1162, "Spread based on existing data for the current member combination" 1164, a "Store" option 1166, or "Spread based on data in" 1168. The selection for "Spread based on data in" option 1168 includes a drop-down list for each dimension for selecting one of the members associated with the dimension. In this example, the comparison vector comprises the following dimensions: an "Accounts" dimension 1170 and drop-down list box 1171 for selecting an "Accounts" member; a "Versions" dimension 1172 and drop-down list box 1173 for selecting a member for the "Versions" dimension; and a "Time" dimension 1174 and drop-down list box 1175 for selecting a "Time" dimension member. As shown, the dialog box 1140 also includes the checkbox 1112 for enabling/disabling the dialog box prompting as described above.

Figure 12:
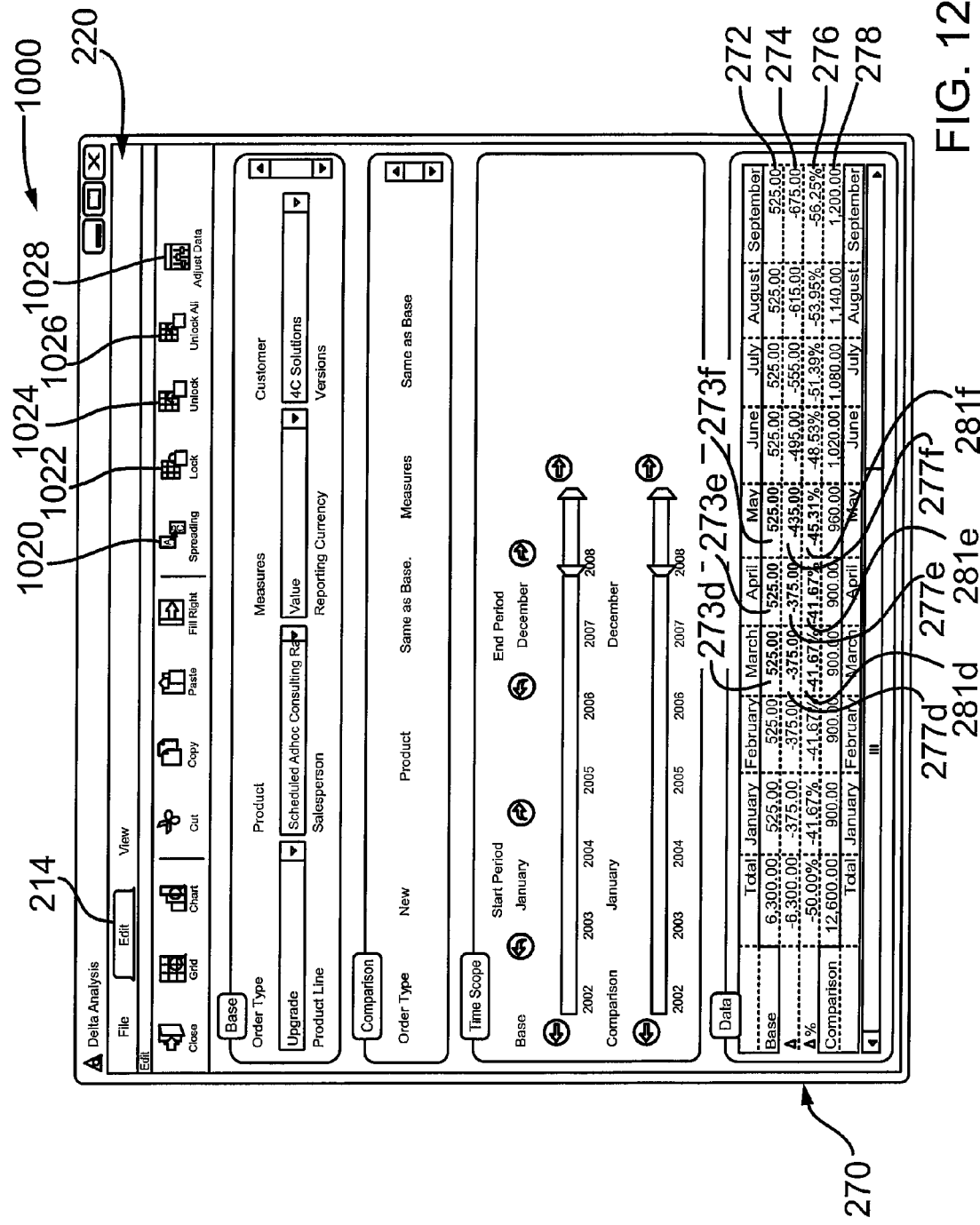
FIG. 12 is an exemplary screen shot of the delta processor configured with a locking mechanism for locking months to prevent data values being changed in accordance with an embodiment.
Figure 13:
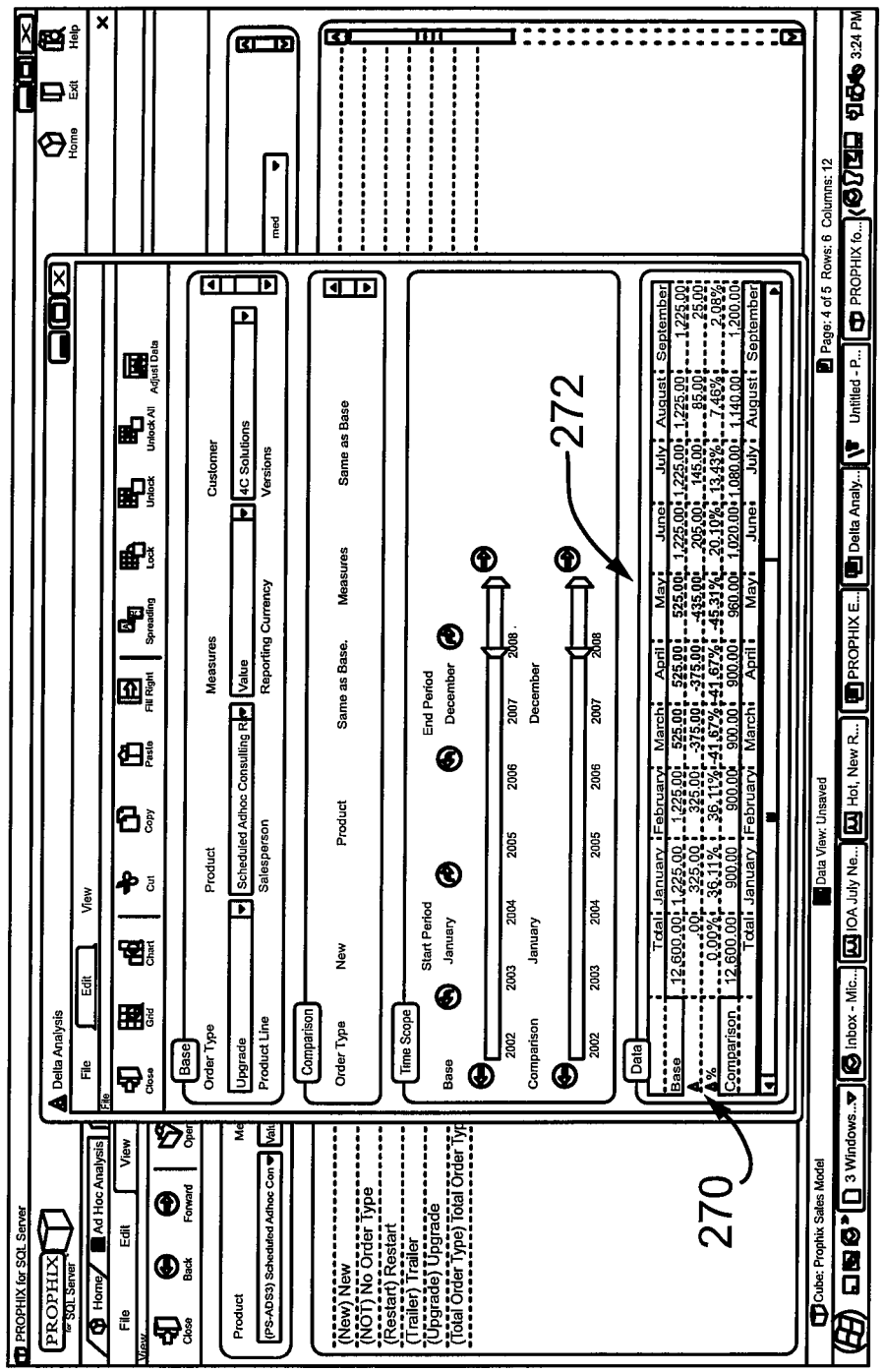
FIG. 13 is an exemplary screen shot of the delta processor configured with a locking mechanism that prevents data values being spread to locked cells in accordance with an embodiment.

Reference is next made to FIG. 12, which shows a screenshot of the Edit screen 1000 configured with the locking function. The locking function comprises a function or software component in the data analysis processor 128 that is responsive to the selection (e.g. right-clicking each of the cells) of one or more data cells in the grid 270 and the clicking of the "Lock" button 1022. According to the example shown in FIG. 12, the data cells 273d, 273e and 273f (i.e. corresponding to the months "March", "April" and "May") are locked together with the data cells 277d, 277e, 277f in the delta row 274, and the data cells 281d, 281e, 281f in the delta % row 276. Once the data cells are locked, the data cannot be changed in any of the cells without first unlocking the cell (i.e. using the Unlock function button 1024) or all the cells (i.e. using the Unlock All function button 1026). According to an embodiment, the locked data cells cannot be edited. According to another aspect, the data cannot be spread to the locked cells, for example, as depicted in the window 270 and the grid display 272 shown in FIG. 13.

Figure 14:
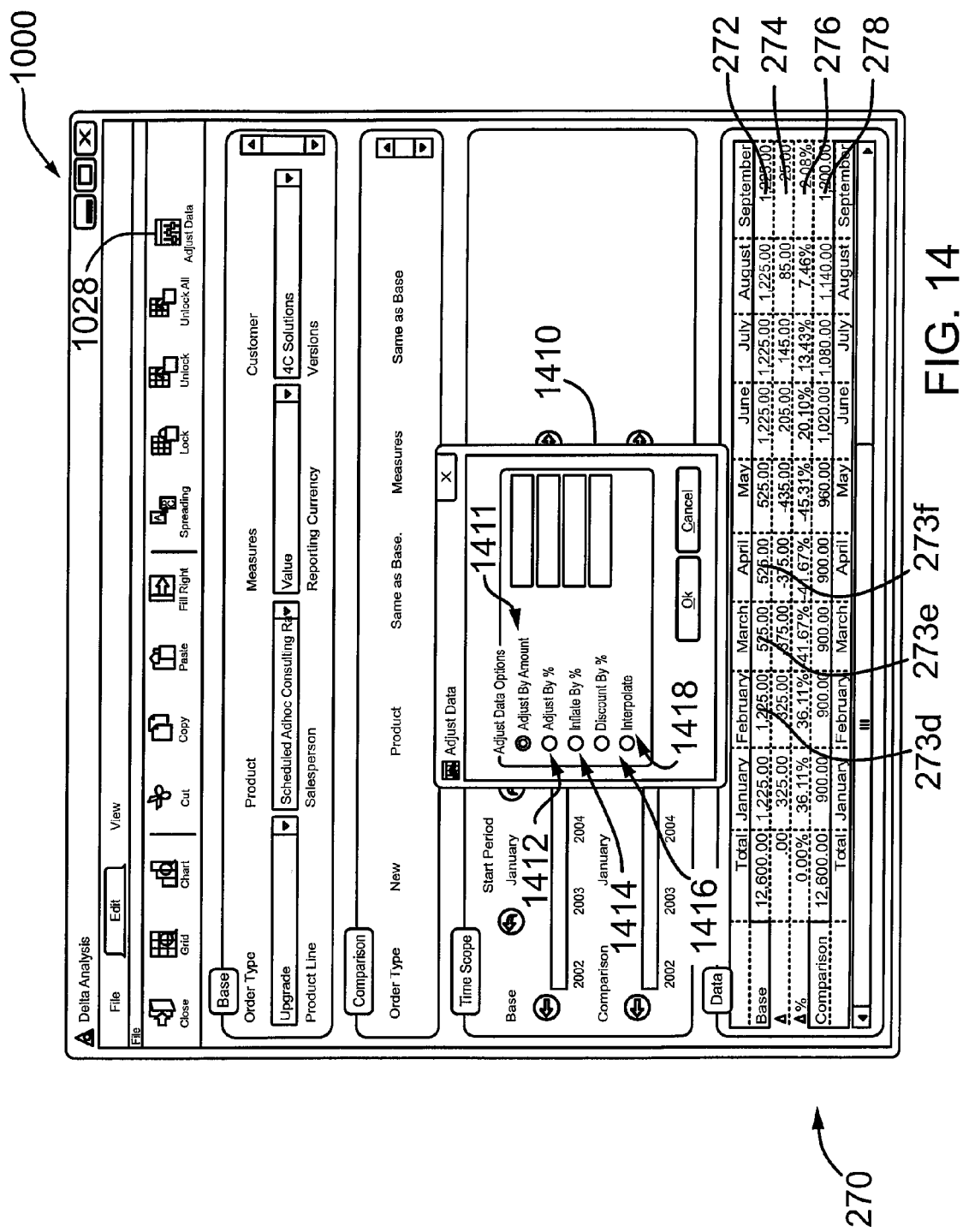
FIG. 14 is an exemplary screen shot of the delta processor configured with a dialog box for adjusting selected months according to a specified parameter.
Figure 15:
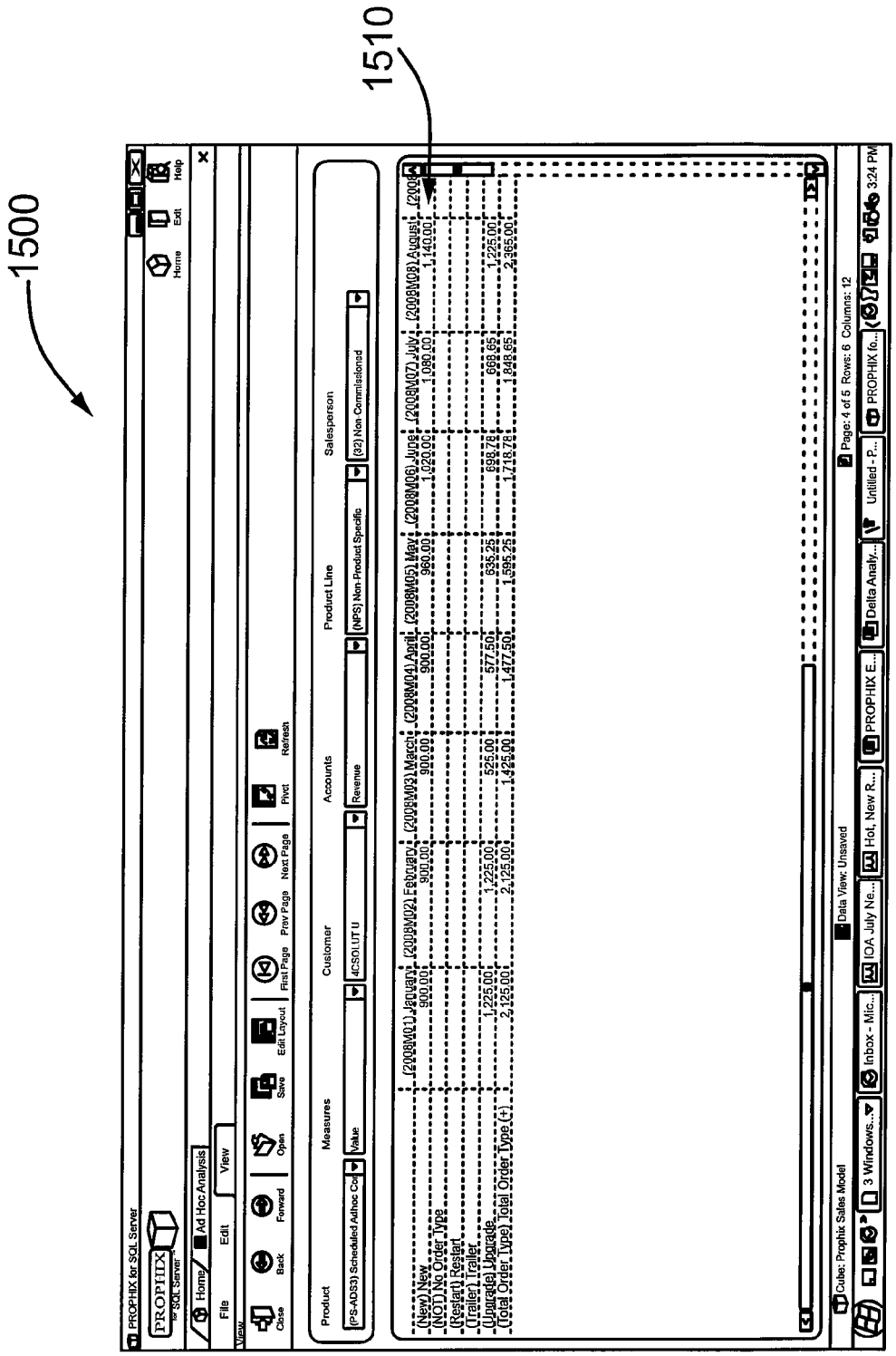
FIG. 15 is an exemplary screen shot of an Ad Hoc analysis screen configured or populated with data generated by the delta processor.

Reference is next made to FIG. 14, which shows the Edit screen 1000 configured with the adjust data mechanism. According to an embodiment of the invention, the data analysis processor 128 is configured with a function or software component to display an Adjust Data dialog box 1410 having the form as shown in FIG. 14. According to an embodiment, the data analysis processor 128 is configured to display the Adjust Data box 1410 when the Adjust Data button 1028 is clicked. According to an embodiment, one or more data cells in the grid 270 can be selected (i.e. right-clicking using a mouse) and then one of the adjust data functions defined in the dialog box 1410 is selected and a corresponding adjust function is executed by the data analysis processor 128. For the example depicted in FIG. 14, the data cells 273d, 273e and 273f in the base vector row 272 have been selected for the "data adjust" operation. According to an embodiment, the Adjust Data dialog box 1410 comprises five adjust data operations: an "Adjust By Amount" operation 1411, an "Adjust By %" operation 1412, an "Inflate By %" operation 1414, a "Discount By %" operation 1416, and an "Interpolate" operation 1418. According to an embodiment, the adjust data operation is disabled for any locked cells.

Reference is next made to Table 1 which summarizes the five types of adjustment operations according to an embodiment.

TABLE 1

| Calculation Type | Contiguous Cells Required? | Parameter Entered |
| --- | --- | --- |
| Adjust By Amount (1411) | No | Amount to Adjust |
| Adjust By % (1412) | No | % to adjust |
| Inflate By % (1414) | Yes | % to Inflate |
| Discount By % (1416) | Yes | % to Discount |
| Interpolate (1418) | Yes | None |

According to an embodiment, the data analysis processor 128 is configured to allow non-contiguous cells to be selecting using the mouse in conjunction with the Ctrl button.

For the "Adjust by Amount" function 1411 (FIG. 14), the data is entered in the same format (e.g. numerical format) as the data is displayed in the data cell on the chart 270 (FIG. 14). For the "percentage (%) adjust" functions, i.e. Adjust By % 1412 (FIG. 14), Inflate By % 1414 (FIG. 14), Discount By % 1416 (FIG. 14), the data is entered the format '0.00%'. According to another aspect, for the "Inflate By %" flnction 1414 and the "Discount by %" function 1416, the % value data entered is adjusted if the periodicity for the base vector 230 (FIG. 1) is other than Yearly. According to an embodiment, the data analysis processor 128 is configured with a function for adjusting the % entered are as follows:

$$\%_{New} = ((1+\%_{Old})^{(1/N)}) - 1$$

where:

N is the number of periods currently being displayed that are in a year; and

^ is the exponentiation operator.

For example, if the periodicity is in Quarters and the value entered is 46.41%, then the adjusted value is calculated as 10% (i.e. $(1.1)^4 = 1.4641$).

Reference is next made to Table 2, which further illustrates operation of the adjust mechanism for four exemplary data cells (e.g. data cells 273d, 273e, 273f, 273g) according to an embodiment of the invention.

TABLE 2

| Calculation Type | (Adjusted) Parameter Value | (273d) 1,000 | (273e) 2,000 | (273f) 3,000 | (273g) 2,000 |
|---|---|---|---|---|---|
| | | Values Before the Adjustment | | | |
| | | Values After the Adjustment | | | |
| Adjust By Amount (1411 - FIG. 14) | 1,500 | 2,500 | 3,500 | 4,500 | 3,500 |
| Adjust By % (1412 - FIG. 14) | 5.00% | 1,050 | 2,100 | 3,150 | 2,100 |
| Inflate By % (1414 - FIG. 14) | 5.00% | 1,000.00 | 1,050.00 | 1,102.50 | 1,157.63 |
| Discount By % (1416 - FIG. 14) | 5.00% | 1,000.00 | 952.38 | 907.03 | 863.84 |
| Interpolate (1418 - FIG. 14) | | 1,000 | 1,333 | 1,667 | 2,000 |

For the "Inflate By %" operation 1414, a function or software process is configured in the data analysis processor 128 to operate as follows:

the first data cell (i.e. 273d) retains the original value;

the second data cell (i.e. 273e) is calculated to be the value in the cell to its left (i.e. the first cell) multiplied by (1+Adjusted Parameter Value);

this operation is repeated until the rightmost cell has been calculated

For the "Discount By %" operation 1416, a function or software process is configured in the data analysis processor 128 to operate as follows:

the first data cell (i.e. 273d) retains the original value;

the second data cell (i.e. 273e) is calculated to be the value in the cell to its left (i.e. the first cell 273d) divided by (1+Adjusted Parameter Value)

the function repeats this operation until the rightmost data cell (i.e. 273g) is calculated.

For the "Interpolate" operation 1418, a function or software process is configured in the data analysis processor 128 to operate as follows:

first an 'increment' value or parameter is calculated as:

(the value in the rightmost data cell (i.e. data cell 273g) minus the value in the leftmost cell (i.e. data cell 273d)) divided by (the number of cells less 1)—this may be negative;

the first data cell (i.e. 273d) retains its original value;

the second data cell (i.e. 273e) is calculated as the value in the data cell to its left (i.e. data cell 273d) plus 'increment' this operation is repeated until the rightmost data cell (i.e. 273g) has been calculated.

The functionality and features associated with the data analysis processor or module 128 (FIG. 1) and/or the server 120 (FIG. 1) and/or the client machines 110 (FIG. 1) and/or the user interface screens or windows for the data analysis processor or module 128 (FIGS. 2 to 15) as described above and in accordance with the embodiments may be implemented in the form of one or more software objects, components, or computer programs or program modules in the server and/or the client machines. Further, at least some or all of the software objects, components or modules can be hard-coded into processing units and/or read only memories or other non-volatile storage media in the mobile communication device, server and/or other components or modules depicted in the drawings. The specific implementation details of the software objects and/or program modules will be within the knowledge and understanding of one skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A computer system including a client computer configured with a graphical user interface display system and the client computer being operatively coupled to a processor configured to process a base vector comprising data stored and retrieved from an online analytical processing cube or OLAP cube stored in a database, said graphical user interface display system configured on the client computer comprising:

a base vector panel comprising one or more dimensions associated with data stored in the OLAP cube, and said one or more dimensions comprising a user responsive component for selecting a member associated with each of said one or more dimensions;

a comparison vector panel comprising one or more dimensions associated with data stored in the OLAP cube, and said one or more dimensions corresponding to said one or more dimensions in said base vector panel;

a time scope panel configured for setting a time frame for said base vector and said comparison vector, said time frame comprising a start period setting control and an end period setting control, said start period setting and said end period setting controls being responsive to user input;

a data analysis processor; and a data analysis panel comprising a base vector display, a comparison vector display and a delta vector, said base vector display being configured to render the data values for the cells in the OLAP cube corresponding to said dimensions and said members selected in said base vector panel, said delta vector comprising a plurality of data cells corresponding to said one or more dimensions of said base vector panel and each of said data cells being responsive to manipulation by a user and render the manipulated data values for performing a delta analysis, and said comparison vector display being configured to render data values for said dimensions and said members selected in said comparison vector panel wherein said data values are generated by said data analysis processor performing said delta analysis.

2. The graphical user interface system as claimed in claim 1, wherein said data analysis panel comprises a delta % vector comprising a plurality of data cells corresponding to said one or more dimensions of said base vector panel, and said plurality of data cells in said delta % vector being responsive to a delta % operation, and said data analysis processor being configured to perform said delta % operation and said comparison vector display being configured to render the data values generated from said delta % operation.

3. The graphical user interface system as claimed in claim 2, wherein said delta % vector comprises a total field and a plurality of data fields configured for holding data values corresponding to said dimensions and said members selected in said base vector panel, and said total field is configured to accept a user data value, and said data analysis processor is configured to spread said user data value across said plurality of data fields.

4. The graphical user interface system as claimed in claim 2, wherein said data analysis processor is configured to apply a delta analysis operation comprising taking a difference between the data values for the cells in the OLAP cube corresponding to said dimensions and said members and the respective data values in said comparison vector display and the resultant difference data values being rendered in said respective data cells in said delta vector.

5. The graphical user interface system as claimed in claim 1, wherein said user responsive component comprises a drop-down list component configured for listing a plurality of members associated with each of said one or more dimensions, and said drop-down list being configured to be responsive to a user input to select one of said plurality of members and retrieve data from cells in the OLAP cube corresponding to said selected members and display said retrieved data in said base vector display in said data analysis display window.

6. The graphical user interface system as claimed in claim 1, wherein said user responsive component comprises a drop-down list component configured for listing a plurality of members associated with each of said one or more dimensions, and said drop-down list being configured to be responsive to a user input to select one of said plurality of members and retrieve data from cells in the OLAP cube corresponding to said selected members and display said retrieved data in said base vector display in said data analysis display window.

7. A computer system including a client computer configured with a graphical user interface display system and the client computer being operatively coupled to a processor configured to process a base vector comprising data stored and retrieved from an online analytical processing cube or OLAP cube stored in a database, said graphical user interface display system configured on the client computer, comprising:
  a base vector panel comprising one or more dimensions associated with data stored in the OLAP cube, and said one or more dimensions comprising a user responsive component for selecting a member associated with each of said one or more dimensions;
  a comparison vector panel comprising one or more dimensions associated with data stored in the OLAP cube, and said one or more dimensions corresponding to said one or more dimensions in said base vector panel;
  a time scope panel configured for setting a time frame for said base vector and said comparison vector, said time frame comprising a start period setting control and an end period setting control, said start period setting and said end period setting controls being responsive to user input;
  a data analysis processor;
  a data analysis panel comprising a base vector display, a comparison vector display and a delta vector, said base vector display comprising a plurality of data cells corresponding to said dimensions and said members selected in said base vector panel and being configured to render the data values for the associated cells in the OLAP cube, said delta vector comprising a plurality of data cells corresponding to said one or more dimensions of said base vector panel, and said comparison vector display being configured to render data values for said dimensions and said members selected in said comparison vector panel wherein said data values are generated by said data analysis processor performing a delta analysis operation;
  said plurality of data cells in said base vector display being configured to be responsive to entry of data values by a user, and said plurality of data cells in said delta vector being configured to be responsive to entry of data values by the user; and
  said data analysis processor being configured to execute a delta operation based on the entry of data values in said base vector display and another delta operation based on the entry of data values in said delta vector.

8. The graphical user interface display system as claimed in claim 7, wherein said data analysis panel comprises a delta % vector comprising a plurality of data cells corresponding to said one or more dimensions of said base vector panel, and said data analysis processor configured to execute a delta operation based on the entry of data values in said delta % vector.

9. The graphical user interface display system as claimed in claim 8, wherein said data analysis processor is configured to perform a spread operation across said plurality of data cells based on a data value entered in one of said plurality of data cells.

10. The graphical user interface display system as claimed in claim 7, wherein said data analysis processor is configured to store said base vector data values in the OLAP cube in response to a user action.

* * * * *